United States Patent
Chakrabarty et al.

(10) Patent No.: US 12,008,298 B2
(45) Date of Patent: Jun. 11, 2024

(54) EVALUATING FUNCTIONAL FAULT CRITICALITY OF STRUCTURAL FAULTS FOR CIRCUIT TESTING

(71) Applicant: Duke University, Durham, NC (US)

(72) Inventors: Krishnendu Chakrabarty, Durham, NC (US); Arjun Chaudhuri, Durham, NC (US); Jonti Talukdar, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 899 days.

(21) Appl. No.: 17/080,341

(22) Filed: Oct. 26, 2020

(65) Prior Publication Data

US 2022/0129732 A1   Apr. 28, 2022

(51) Int. Cl.
  *G06F 30/367*  (2020.01)
  *G06F 30/398*  (2020.01)
  *G06N 3/045*  (2023.01)
  *G06F 117/02*  (2020.01)

(52) U.S. Cl.
  CPC .......... *G06F 30/367* (2020.01); *G06F 30/398* (2020.01); *G06N 3/045* (2023.01); *G06F 2117/02* (2020.01)

(58) Field of Classification Search
  CPC .................................................. G06F 30/367
  USPC ....................................................... 716/106
  See application file for complete search history.

(56) References Cited

U.S. PATENT DOCUMENTS

2021/0240905 A1 * 8/2021 Guo .................. G06F 30/398

OTHER PUBLICATIONS

Sze, V., et al., "Efficient Processing of Deep Neural Networks: A Tutorial and Survey", Proceedings of the IEEE, Dec. 2017, pp. 2295-2329, vol. 105, No. 12.
Guo, X., et al., "A Systolic Array-Based FPGA Parallel Architecture for the BLAST Algorithm", 2012, 11 Pages, ISRN Bioinformatics, vol. 2012.
Deng, J., et al., "ImageNet: A Large-Scale Hierarchical Image Database," 2009 IEEE Conference on Computer Vision and Pattern Recognition, 2009, pp. 248-255.
Samajdar, A., et al., "SCALE-Sim: Systolic CNN Accelerator Simulator", arXiv preprint arXiv:1811.02883, Oct. 16, 2018, 11 Pages.
Vincent, J., "Google unveils tiny new AI chips for on-device machine learning", Retrieved From: https://www.theverge.com/2018/7/26/17616140/google-edge-tpu-on-device-ai-machine-learning-devkit, Jul. 26, 2018, 3 Pages.
Jouppi, N. P., et al., "In-Datacenter Performance Analysis of a Tensor Processing Unit", in ISCA, Jun. 26, 2017, pp. 1-12, Toronto, Canada.

(Continued)

*Primary Examiner* — Eric D Lee
(74) *Attorney, Agent, or Firm* — Talem IP Law, LLP

(57) ABSTRACT

A system for evaluating fault criticality using machine learning includes a first machine learning module that is trained on a subset of a circuit and used for evaluating whether a node in a netlist of the entire circuit is a critical node, and a second machine learning module specialized to minimize classification errors in nodes predicted as benign. A generative adversarial network can be used to generate synthetic test escape data to supplement data used to train the second machine learning module.

12 Claims, 17 Drawing Sheets

(56) References Cited

OTHER PUBLICATIONS

Lu, W., et al., "FlexFlow: A Flexible Dataflow Accelerator Architecture for Convolutional Neural Networks", IEEE International Symposium on HPCA, 2017, pp. 553-564.
Chen, Y., et al., "Eyeriss: An Energy-Efficient Reconfigurable Accelerator for Deep Convolutional Neural Networks", IEEE Journal of Solid-State Circuits, Jan. 2017, pp. 127-138, vol. 52, No. 1.
Talpes, E., et al., "Compute Solution for Tesla's Full Self-Driving Computer", IEEE Micro, Mar.-Apr. 2020, pp. 25-35, vol. 40, No. 2.
Liu, Y., et al., "Deterministic Stellar BIST for Automotive ICs", IEEE Transactions on Computer-Aided Design of Integrated Circuits and Systems, Aug. 2020, pp. 1699-1710, vol. 39, No. 8.
Li, G., et al., "Understanding Error Propagation in Deep Learning Neural Network (DNN) Accelerators and Applications", Association for Computing Machinery (ACM), Nov. 12-17, 2017, pp. 1-12, Denver, CO.
Zang, J., et al., "Analyzing and Mitigating the Impact of Permanent Faults on a Systolic Array Based Neural Network Accelerator", IEEE 36th VLSI Test Symposium (VTS), 2018, pp. 1-6.
Ernst, R., et al., "Mixed Criticality Systems—A History of Misconceptions?", IEEE Design & Test, Oct. 2016, pp. 65-74, vol. 33, No. 5.
Lecun, Y., et al., "Gradient-Based Learning Applied to Document Recognition", Proceedings of the IEEE, Nov. 1998, pp. 2278-2324, vol. 86, No. 11.
Kung, H. T., "Why Systolic Architectures?", Retrieved From: http://www.eecs.harvard.edu/~htk/publication/1982-kung-why-systolic-architecture.pdf, Jan. 1982, 10 Pages.
Jouppi, N., et al., "Motivation for and Evaluation of the First Tensor Processing Unit", IEEE Micro, May/Jun. 2018, pp. 10-19, vol. 38, No. 3.
"System Architecture of Google TPU v2/v3", Retrieved From: https://cloud.google.com/tpu/docs/system-architecture, Sep. 25, 2020, 9 Pages.
Schütze, H., et al., "Performance Thresholding in Practical Text Classification", International Conference on Information and Knowledge Management, Nov. 2006, pp. 662-671.
Freedman, L. S., et al., "The Problem of Underestimating the Residual Error Variance in Forward Stepwise Regression", Journal of the Royal Statistical Society, Series D (The Statistician), 1992, pp. 405-412, vol. 41, No. 4.
Reagen, B., et al., "Ares: A framework for quantifying the resilience of deep neural networks", Design Automation Conference (DAC), 2018, pp. 1-6.
Baldi, P., et al., "Understanding Dropout", In Proceedings of the 26th International Conference of Neural Information Processing Systems, Dec. 2013, pp. 2814-2822, vol. 2.
Gebregiorgis, A., et al., "Testing of Neuromorphic Circuits: Structural vs Functional", in IEEE International Test Conference (ITC), 2019, pp. 1-10, Washington, DC.
Zhang, J., et al., "Fault-Tolerant Systolic Array Based Accelerators for Deep Neural Network Execution", IEEE Design & Test, Oct. 2019, pp. 44-53, vol. 36, No. 5.
Xu, Z., et al., "Safety Design of a Convolutional Neural Network Accelerator with Error Localization and Correction", 2019 IEEE International Test Conference (ITC), pp. 1-10, Washington, DC.
Mahajan, D., et al., "Exploring the Limits of Weakly Supervised Pretraining", Proceedings of the European Conference on Computer Vision (ECCV), 2018, pp. 181-196.
Chen, T., et al., "Universal Approximation to Nonlinear Operators by Neural Networks with Arbitrary Activation Functions and Its Application to Dynamical Systems", IEEE Transactions on Neural Networks, Jul. 1995, pp. 911-917, vol. 6, No. 4.
Radford, A., et al., "Unsupervised Representation Learning with Deep Convolutional Generative Adversarial Networks", arXiv:1511.06434v2, Jan. 7, 2016, 16 Pages.
Goodfellow, I. J., et al., "Generative Adversarial Nets", in Proceedings of the 27th International Conference on Neural Information Processing Systems, Dec. 2014, pp. 2672-2680, vol. 2.
Bianco, S., et al., "Benchmark Analysis of Representative Deep Neural Network Architectures", IEEE Access, 2018, pp. 64270-64277, vol. 6.
Guo, X., "Design of systolic array-based FPGA parallel architecture for the BLAST algorithm and its implementation", Theses and Dissertations, 2012, Paper 326.

\* cited by examiner

EVALUATING FUNCTIONAL FAULT CRITICALITY OF STRUCTURAL FAULTS FOR CIRCUIT TESTING

BACKGROUND

Functional fault testing is commonly performed during design verification of a circuit to determine how resistant a circuit architecture is to errors manifesting from manufacturing defects, aging, wear-out, and parametric variations in the circuit. Each node can be tested by manually injecting a fault to determine whether or not that node is critical—in other words, whether it changes a terminal output (i.e., an output for the circuit architecture as a whole) for one or more terminal inputs (i.e., an input for the circuit architecture as a whole). Indeed, the functional criticality of a fault is determined by the severity of its impact on functional performance. If the node is determined to be critical, it can often degrade circuit performance or, in certain cases, eliminate functionality.

In recent years, deep neural networks (DNNs) have emerged as a workhorse for data-intensive applications such as image classification and segmentation, voice recognition and natural language processing. The ubiquitous application of DNNs has led to a rise in demand for custom artificial intelligence (AI) accelerators. Many such use-cases require high reliability. Built-in self-test (BIST) can be used for enabling power-on self-test in order to detect in-field failures. However, DNN inferencing applications such as image classification are inherently fault-tolerant with respect to structural faults; it has been shown that many faults are not functionally critical, i.e., they do not lead to any significant error in inferencing. As a result, conventional pseudo-random pattern generation for targeting all faults with BIST is an "over-kill".

Furthermore, fault simulation of an entire neural network hardware architecture to determine the critical nodes is computationally expensive—taking days, months, years, or longer—due to large models and input data size.

BRIEF SUMMARY

Techniques and systems are provided to minimize overhead for circuit testing—both during simulation and hardware fault testing. Machine learning is used to evaluate fault criticality for circuit testing by predicting criticality of faults without requiring simulation of the entire circuit. As described herein, machine learning is used to accurately evaluate fault criticality for any node in any part of a circuit based on a small sample of the circuitry. Generative Adversarial Networks (GANs) can be used to supplement the training process for the machine learning models in order to increase a size of training data.

A system for evaluating fault criticality using machine learning includes a first machine learning module that is trained on a subset of a circuit and used for evaluating whether a node in a netlist of the entire circuit is a critical node, and a second machine learning module specialized to minimize classification errors in nodes predicted as benign. The circuit can be considered a target hardware architecture having an applied domain-specific use-case. The target hardware architecture can be, for example, an artificial intelligence (AI) accelerator with a systolic array of processing units such as used for neural networks. The domain-specific use-case can include any application including those used for inferencing. Examples include image classification and segmentation (with applications to autonomous driving, manufacturing automation, and medical diagnostics as some examples), voice recognition, and natural language processing. In operation, the first machine learning module can receive a feature set of topology features and data features for a plurality of nodes of a target hardware architecture having an applied domain-specific use-case; receive an entire netlist for the target hardware architecture having the applied domain-specific use-case; and output a dataset of predicted benign nodes and a dataset of predicted critical nodes for the entire netlist. The dataset of predicted critical nodes can be output to a storage device and stored at the storage device.

The second machine learning module can receive the dataset of predicted benign nodes and output a dataset of predicted benign nodes and a dataset of predicted test escape nodes. The dataset of predicted test escape nodes can be output to the storage device and stored at the storage device as part of the dataset of predicted critical nodes stored at the storage device.

The system for evaluating fault criticality using machine learning can further include a module for determining a targeted testing methodology based on the domain-specific fault criticality for the domain-specific use-case applied on the target hardware architecture. The module for determining a targeted testing methodology can receive the dataset of predicted critical nodes and receive a customer application target. The predicted critical nodes can be used to determine which nodes are to be tested and the customer application target can be used to determine how the nodes to be tested are tested.

The system can be trained by using fault simulation data corresponding to a subset of an entire circuit to be tested. The fault simulation data assigns certain nodes as known critical nodes and certain nodes as known benign nodes for the subset of the entire circuit. The first machine learning module can be trained using the fault simulation data of known critical nodes and known benign nodes for the subset of the entire circuit. The second machine learning module is trained on the output of predicted benign nodes of the first machine learning module and the fault simulation data of known critical nodes. Additional test data for training the second machine learning module can be generated using a GAN.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Techniques and systems are provided to minimize overhead for circuit testing—both during simulation and hardware fault testing. Fault testing can be computationally and temporally expensive but is required in most cases to ensure circuit functionality. Machine learning is used to evaluate fault criticality for circuit testing by predicting criticality of faults without requiring simulation of the entire circuit. As described herein, machine learning is used to evaluate fault criticality for any node in any part of a circuit based on a small sample of the circuitry. GANs can be used to supplement the training process for the machine learning models in order to increase the size of training data. Advantageously, through the described techniques and systems that use a small sample of the circuitry, it is possible to conduct a more computationally and temporally efficient fault testing.

Figure 1:
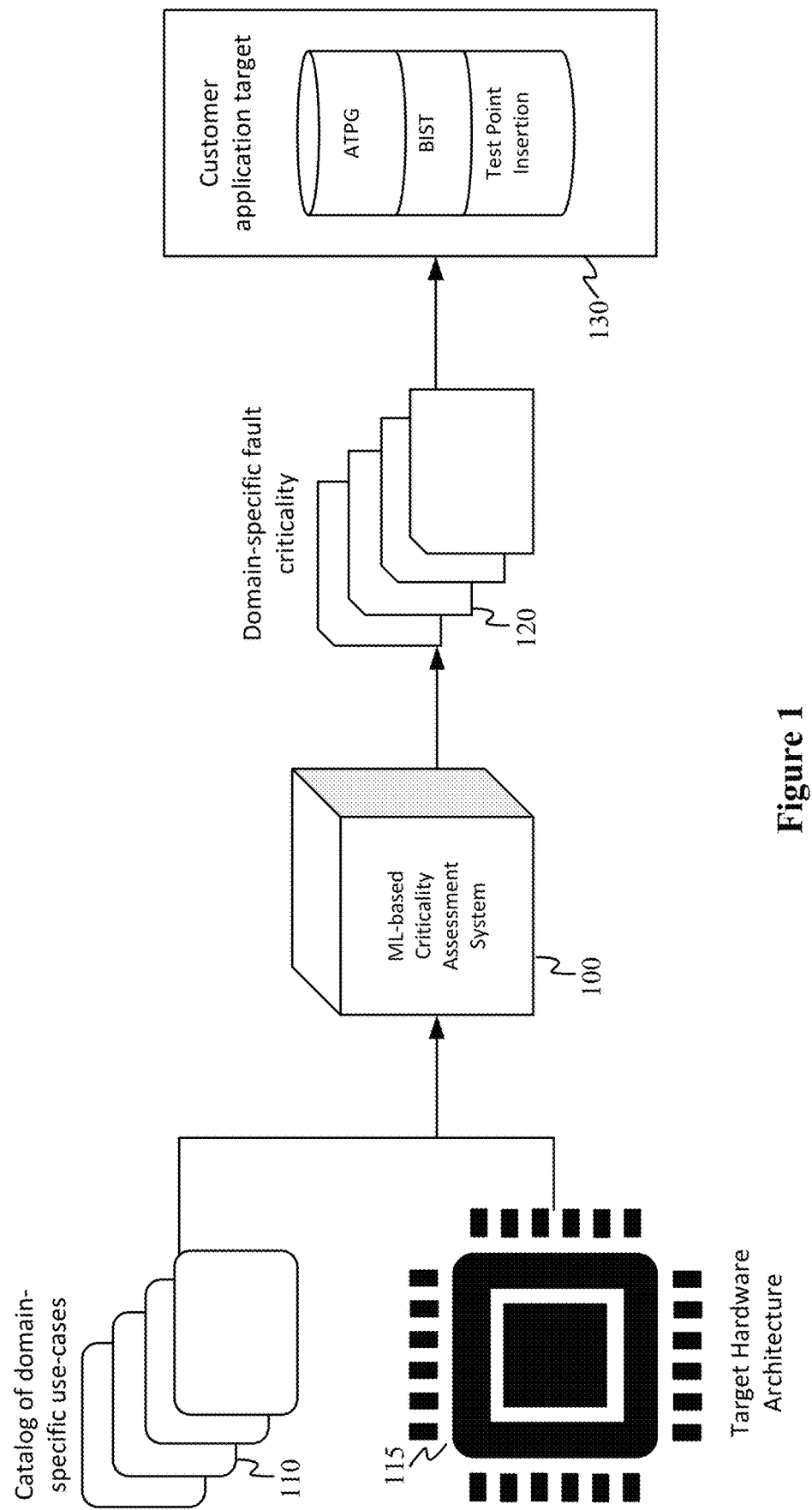
FIG. 1 illustrates a representational diagram of a process flow for evaluating fault criticality for use in generating fault testing schemes for an application target.

FIG. 1 illustrates a representational diagram of a process flow for evaluating fault criticality for use in generating fault testing schemes for an application target. Referring to FIG. 1, a machine-learning-based criticality assessment system 100, which may be embodied such as described with respect to system 200 of FIG. 2, can take in a domain specific use case 110 and a target hardware architecture 115 to generate information of domain-specific fault critically 120. It should be understood that a structural fault is considered functionally critical if the structural fault leads to functional failure. For example, a functional failure can be evaluated in terms of the fault's impact on inferencing accuracy (for the inferencing use-case). A fault can be deemed to be benign if the fault does not affect the inferencing accuracy for this illustrative use-case. An accuracy threshold used for classifying faults as being benign or critical can be predetermined based on the accuracy requirement and safety criticality of the use-case application. For example, if the use-case application is for autonomous vehicles, a higher accuracy may be required due to the important safety considerations. Accordingly, in addition to informing potential thresholds for benign vs. critical, the domain-specific fault criticality 120 can be applied to a customer application target 130 for specific testing measures.

The domain-specific use-case 110 can be selected from among a catalog of pre-existing domain-specific use-cases known by the machine-learning-based criticality assessment system 100 and selected by a user or provided externally. The domain-specific use-case can include any deep learning application including those used for training and inferencing. Examples include deep neural networks for image classification and segmentation (with applications to autonomous driving, manufacturing automation, and medical diagnostics as some examples), regression, voice recognition, and natural language processing. The domain-specific use-case 110 can describe how the target hardware architecture 115 will be deployed or implemented and can be used to inform the domain-specific fault criticality 120. The target hardware architecture 115 can include any computing architecture. The target hardware architecture 115 can be, for example, a systolic array of processing units (e.g., for an AI accelerator).

The circuit to be tested for fault criticality is a target hardware architecture having an applied domain-specific use-case (also referred to as a target hardware architecture with a specific neural network mapping). In some cases, the target hardware architecture having the applied domain-specific use-case can be received by the machine-learning-based criticality assessment system 100 as a representation, for example as a netlist. In some cases, fault data (simulated or actual) of the target hardware architecture having the applied domain-specific use-case is received by the machine-learning-based criticality assessment system 100. The domain-specific use-case 110 applied on the target hardware architecture 115 can be, for example, a specified machine learning system.

In some cases, the machine-learning-based criticality assessment system 100 receives information of a new circuit to be tested before being deployed. In some cases, the machine-learning-based criticality assessment system 100 receives information of a circuit already in operation that is being tested to ensure continued functionality. Indeed, it is possible to train and use the described system 100 for predicting critical nodes of a circuit under the influence of aging (i.e., over time as the circuit structures may degrade). For example, the target hardware architecture can include structural faults due to aging and the faults can be reflected in the node definitions used to both train and evaluate the circuit. The system 100 can further predict critical nodes for faults remaining due to test escape during manufacturing testing (coverage gaps), soft errors (e.g., single-event upset), and unexplained intermittent faults.

The machine-learning-based criticality assessment system 100 can perform operations such as described herein to generate the information of domain-specific fault criticality 120. The information of domain-specific fault criticality 120 can include a dataset of predicted critical nodes.

The one or more customer application targets 130 can be specific testing methodologies for fault testing implementation on the target hardware architecture 115 having the applied domain-specific use-case 110. The described techniques can be useful in creating testing methodologies to determine if a particular instance of the circuit architecture can be used in a certain application, especially in the context of circuit architectures for neural networks. Examples of possible customer application targets 130 include automatic test pattern generation (ATPG), BIST, and test point insertion.

By identifying the critical nodes, the testing methodologies for fault testing can be applied to those nodes identified by the machine-learning-based criticality assessment system 100. By determining where critical nodes exist with further knowledge of what terminal outputs are necessary, a testing methodology can be created to ensure that the particular instance of the circuit architecture can be used for that certain application as well as the extent that testing must be performed (or extent of infrastructure on a chip is needed to be added such as for BIST). Testing can be useful both before deployment and after deployment to ensure continued functionality.

Advantageously, fewer computational resources (and corresponding time and/or chip area) are required to carry out fault testing.

Figure 2:
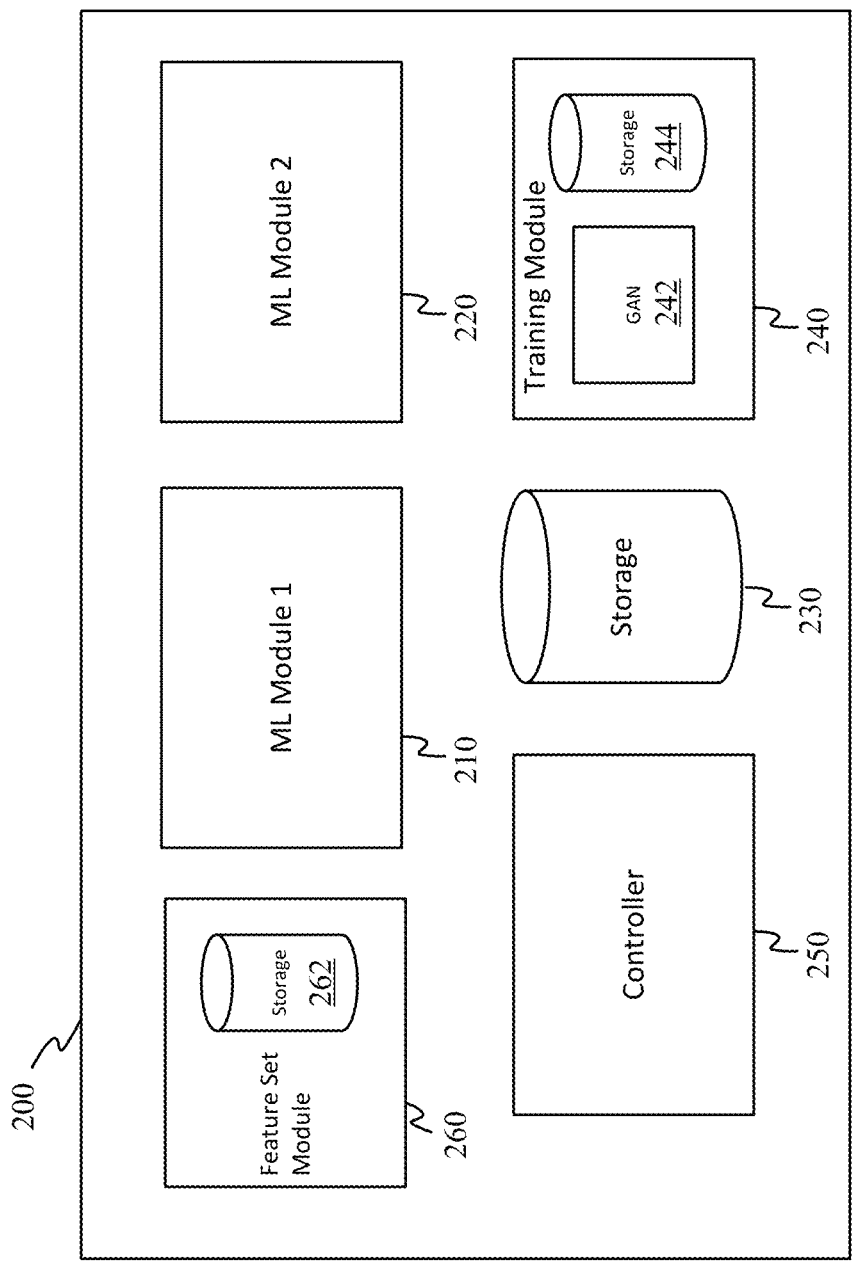
FIG. 2 illustrates an example system for evaluating fault criticality.

FIG. 2 illustrates an example system for evaluating fault criticality. A machine learning (ML) system 200 for evaluating fault criticality can include a first machine learning module 210 that is trained on a subset of a circuit and used for evaluating whether a node in a netlist of the entire circuit is a critical node and a second machine learning module 220 specialized to minimize classification errors in nodes predicted as benign. The ML system 200 can further include a storage resource 230, a training module 240, a controller 250, and a feature set module 260 with feature set resource 262.

The first machine learning module 210 and the second machine learning module 220 may be implemented as convolutional neural networks in the form of instructions and models stored on a storage resource, such as storage resource 230, that are executed and applied by one or more hardware processors, such as embodied by controller 250. In some cases, the first machine learning module 210 and the second machine learning module 220 each have their own dedicated hardware processor. In some cases, these machine learning modules are entirely implemented in hardware.

The storage resource 230 can be implemented as a single storage device but can also be implemented across multiple storage devices or sub-systems co-located or distributed relative to each other. Storage resource 230 can include additional elements, such as a memory controller. Storage resource 230 can also include storage devices and/or sub-systems on which data and/or instructions are stored. As used herein, it should be understood that in no case does "storage device' or "computer-readable storage media" consist of transitory media.

Datasets of benign nodes and datasets of critical nodes (including a dataset of predicted critical nodes from the first machine learning module 210 and a dataset of test escapes from the second machine learning module 220) can be stored at the storage resource 230. The storage resource 230 can also store a netlist of the target hardware architecture, feature sets of topology features and data features used by the network for the first machine learning module 210 (and by the network for the second machine learning module 220), and fault simulation data.

The training module 240 can be used to train the first machine learning module 210 and/or the second machine learning module 220. The system (with the two-tiered machine learning models) can be trained by using fault simulation data corresponding to a subset of an entire circuit to be tested. The fault simulation data assigns certain nodes as known critical nodes and certain nodes as known benign nodes for the subset of the entire circuit. The first machine learning module 210 can be trained using the fault simulation data of known critical nodes and known benign nodes for the subset of the entire circuit. The second machine learning module 220 is trained on the output of predicted benign nodes of the first machine learning module and the fault simulation data of known critical nodes. Additional test data for training the second machine learning module 220 can be generated using a GAN.

Accordingly, for training the first machine learning module 210, the training module 240 can include instructions for generating fault simulation data, deriving representative features from netlist topology and fault-free simulation data, and training a network for the first machine learning module 210 with extracted features and data on existing labelled nodes obtained from the fault simulation data. The training module 240 can further include instructions for training a network for the second machine learning module to distinguish between actual benign features and test-escape features. For training the second machine learning module 220, the training module 240 can include a GAN 242 for generating synthetic test escape data (e.g., producing fake test escape nodes), such as described with respect to FIG. 4B.

The training module 240 can also include a training module storage 244, which can be used to store intermediary weights, final weights, outputs of training sessions, synthetic test escape nodes and known data used by the training module 240. The training module 240 may be in the form of instructions stored on a storage resource, such as storage resource 230 or training module storage 244, that are executed by one or more hardware processors, such as embodied by controller 250. In some cases, the training module 240 has a dedicated hardware processor so that the training processes can be performed independent of the controller 250. In some cases, the training module 240 is entirely implemented in hardware.

The controller 250 can be implemented within a single processing device, chip, or package but can also be distributed across multiple processing devices, chips, packages, or sub-systems that cooperate in executing program instructions. Controller 250 can include general purpose central processing units (CPUs), graphics processing units (GPUs), field programmable gate arrays (FPGAs), application specific processors, and logic devices, as well as any other type of processing device, combinations, or variations thereof.

The feature set module 260 can be used to generate the topology features and data features for a particular target hardware architecture having the applied domain-specific use-case. The topology features are based on the circuit itself and the data features can be fault-free dataflow-based features. Resulting features can be stored in the feature set resource 262 and retrieved by or provided to the first machine learning module. The feature set module 260 can generate the topology features by extracting topology information for each node of the entire netlist through that node's fan-in cone analysis. The feature set module 260 can generate the data features by obtaining a test set of data (e.g., images with associated classes) and compressing the test set of data. Each data in the test set can include a bitstream, where each bitstream includes a certain number of bits corresponding to a total simulation cycle count for inferencing. The test set of data can be compressed using a first method and a second method. The first method compresses bitstreams relating to a same class together and the second method compresses the compressed bitstreams across simulation cycles by, for each simulation cycle, selecting a bit value that occurs most frequently across all data belonging to a particular class. An example of processes that can be carried out by a feature set module 260 are described with respect to FIG. 10. The feature set module 260 may be in the form of instructions stored on a storage resource, such as storage resource 230 or feature set storage 262, that are executed by one or more hardware processors, such as embodied by controller 250. In some cases, the feature set module 260 has a dedicated hardware processor so that the feature set generation processes can be performed independent of the controller 250. In some cases, the feature set module 260 is entirely implemented in hardware.

In some cases, the ML system 200 can include a test method module for determining a targeted testing methodology based on the domain-specific fault criticality for the domain-specific use-case applied on the target hardware architecture. The test method module can receive the dataset of predicted critical nodes (after being updated by the second machine learning module with the test escapes) and the customer application target and then determine a targeted testing methodology for the domain-specific use-case applied on the target hardware architecture using the predicted critical nodes as guides for which nodes to be tested and the customer application target for how the nodes to be tested are tested. For example, the test method module can include a storage resource that has a mapping of system test features suitable for a particular customer application target (e.g., scan chains, boundary flops, etc. for BIST) and can apply or indicate test features to a netlist at the nodes predicted to be critical. As with the other modules described with respect to ML system 200, the test method module can be implemented as instructions stored on a storage resource and executed by controller 250 or a dedicated one or more processors or implemented entirely in hardware.

Figure 3:
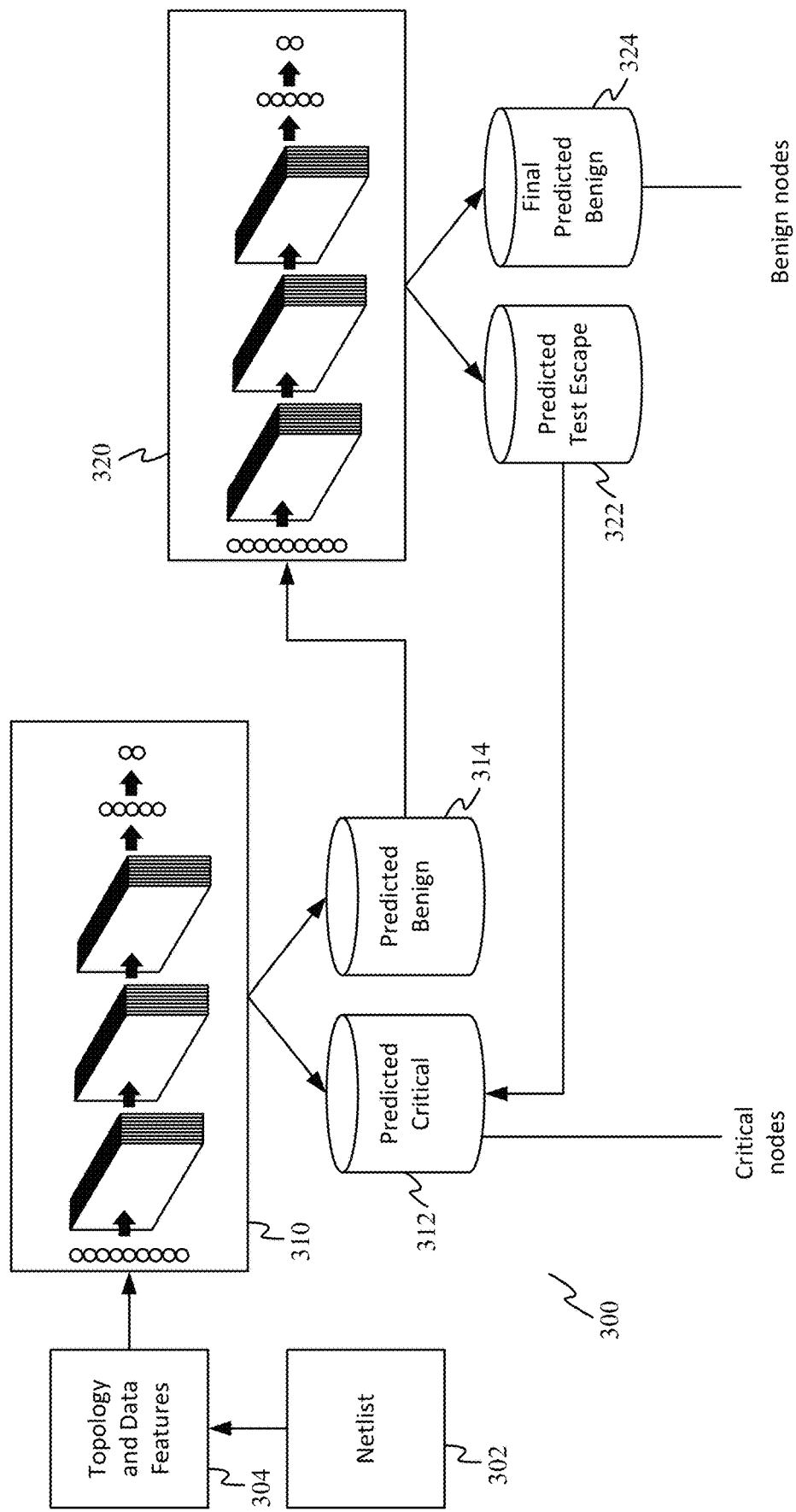
FIG. 3 illustrates an example system flow for a system for evaluating fault criticality.

FIG. 3 illustrates an example system flow for a system for evaluating fault criticality. System 300 includes a first machine learning module 310 and a second machine learning module 320, which may be each be implemented as an appropriate neural network. An example implementation using a deep neural network (DNN) in the form of a convolutional neural network is described with respect to the illustrative example used to evaluate an AI accelerator mapped to a LeNet-5M deep convolutional neural network as described with respect to FIGS. 8A-10.

Here, the first machine learning module 310 can receive a netlist 302 and a feature set 304 of topology features and data features of a plurality of nodes of a target hardware architecture having an applied domain-specific use-case. The netlist 302 may be in any suitable format for representing circuit architecture and connections. The topology features are based on the circuit itself and the data features can be fault-free dataflow-based features. The feature set 304 of topology features and data features can be obtained such as described with respect to FIG. 7.

The first machine learning module outputs a dataset of predicted benign nodes 314 and a dataset of predicted critical nodes 312. The predictions are possible by using a model trained on a subset of the circuit.

Figure 4A:
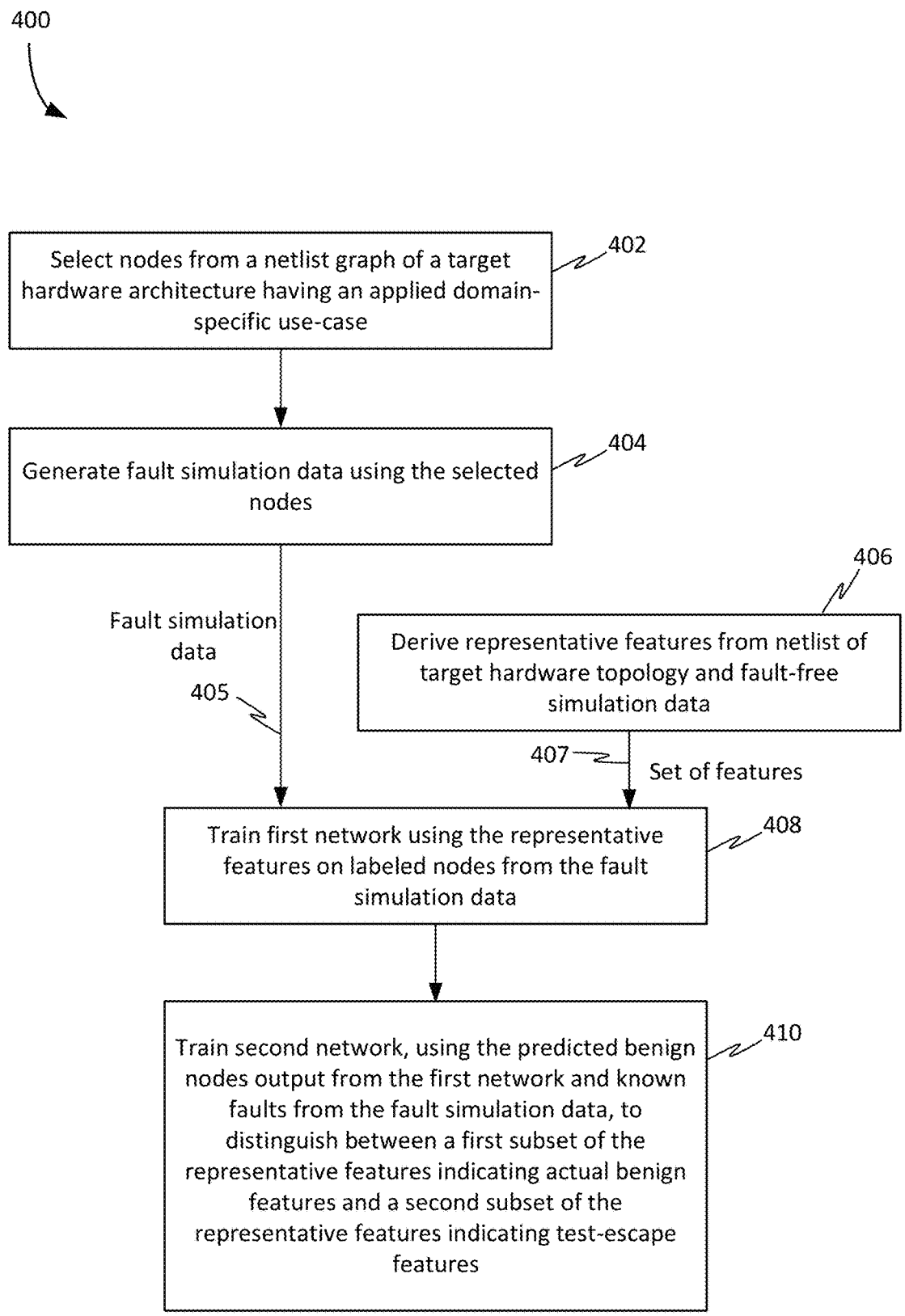
FIG. 4A illustrates a process flow for training a system to evaluate for fault criticality.

Since test escapes (e.g., nodes originally classified as benign but are likely to be critical) may occur due to the training being on a subset of the circuit instead of the entire circuit, a two-tiered system is provided where the first machine learning module 310 classifies nodes as critical or benign and the second machine learning module 320 minimizes test escapes (i.e., lost critical nodes). The second machine learning module 320 receives the dataset of predicted benign nodes identified by the first machine learning module 310 and outputs a dataset of final predicted benign nodes 324 and a dataset of predicted test escape nodes 322. The dataset of predicted test escape nodes 322 are combined with the dataset of predicted critical nodes 312 determined by the first machine learning module 310. FIG. 4A illustrates a process flow for training a system to evaluate for fault criticality; and FIG. 4B details an optional process for additional test data for training.

Referring to FIG. 4A, method 400 can include pre-processes of selecting (402) nodes from a netlist graph of a target hardware architecture having an applied domain-specific use-case and generating (404) fault simulation data 405 using the selected nodes. The fault simulation data 405 need not be exhaustive, as long as sufficient data is provided for the purposes of training. The fault simulation data can correspond to a subset of an entire circuit to be tested. For example, nodes from all levels of a netlist graph can be sampled uniformly across train, test, and validation set and these nodes have a simulated fault injected (e.g., stuck at 0, stuck at 1, bridging (shorts), opens) to determine whether the fault injected at that node results in an error. The fault simulation data results in known critical nodes and known benign nodes. As an illustration of the node sampling technique, nodes are selected for the training dataset, D, such that the features of the entire netlist are well represented in D by levelizing the circuit based on depth of the node from primary inputs (starting from the primary inputs, mark level of each node as max(levels of its previous neighbors)+1), selecting nodes uniformly from each level of the circuit for fault simulation (selecting/sampling equal number of nodes for fault simulation from each level, the nodes constituting the training dataset, D), and dataset partitioning during machine learning training and validation (if the size-ratio of training to validation sets is p:(1p), allocate each node in D to the training and validation sets with probability p and (1-p), respectively). An example is described with respect to the illustrative scenario of FIGS. 8A-10. Method 400 can further include a pre-process of deriving (406) representative features from a netlist of the target hardware topology and fault-free simulation data. Operation 406 extracts a set of features 407 including topology features and data features from a subset of the entire circuit to be tested, for example, as described with respect to FIG. 7.

Training of the networks of the machine learning modules can begin with receiving the fault simulation data 405 for a target hardware architecture having an applied domain-specific use-case and a set of features 407 including topology features and data features for a plurality of nodes (from a subset of the entire circuit); and training (408) a first network using the representative features (the set of features 407) on labeled nodes from the fault simulation data 405. That is, a first machine learning module can be trained using the fault simulation data 405 to predict fault criticality of a particular node of a subset of the entire circuit based on topology and data features for the particular node with respect to the set of features 407. The training of the first machine learning module produces predicted benign nodes and predicted critical nodes. A second network is trained (410) using the predicted benign nodes output from the first network and known faults from the fault simulation data 405 to distinguish between a first subset of the representative features indicating actual benign features and a second subset of the representative features indicating test escape features. That is, a second machine learning module can be trained using the fault simulation data 405 and at least the set of predicted benign nodes produced by the first machine learning module in operation 408.

In some implementations, a third machine learning module can be used to review the dataset of predicted critical nodes to remove false positives. However, in many scenarios, it can be more important to not miss any critical nodes than to incorrectly include benign nodes. Removing false positives can be omitted, for example, where testing (once a methodology is known) is relatively short and simple but missing a test on a critical node can prove problematic.

Figure 4B:
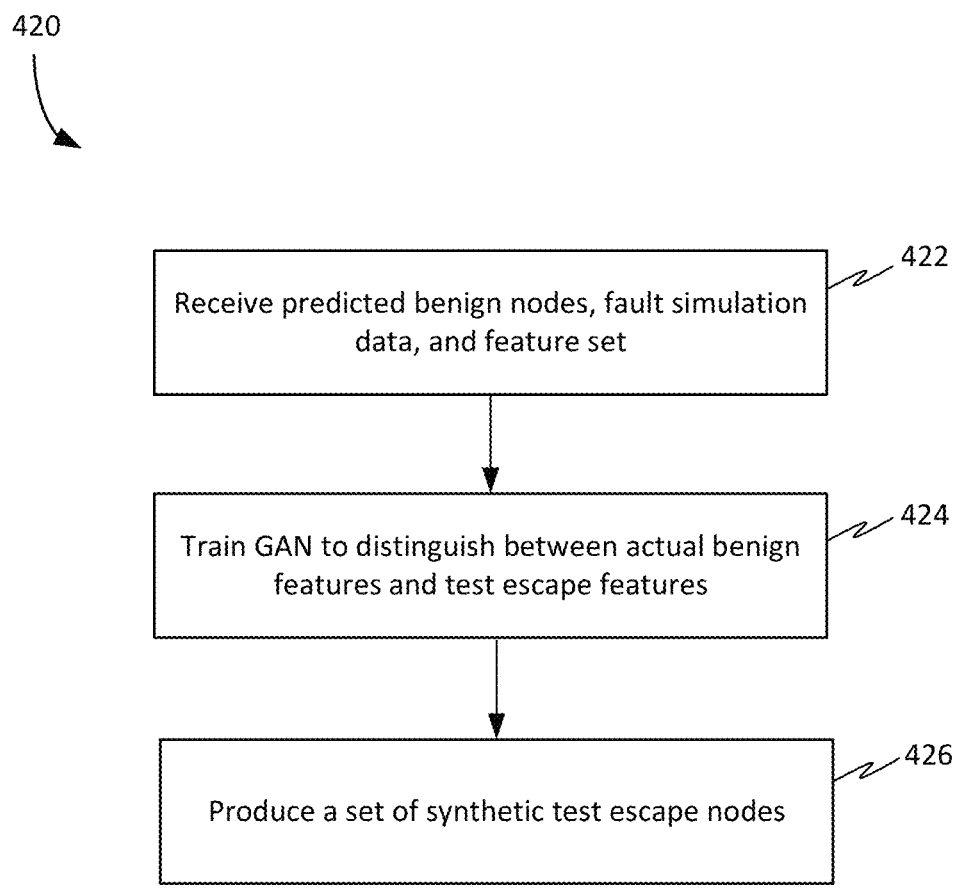
FIG. 4B details an optional process for additional test data for training.

Referring to FIG. 4B, additional realistic predicted benign nodes that are actually critical (i.e., test escape nodes) can be generated according to method 420 to ensure the training of the second machine learning module is sufficiently rigorous and more expedient. Here, the predicted benign nodes, fault simulation data, and feature set of topology features and data features can be received (422). A GAN can be trained (424) using an input feature map from the received data as the real data. Once trained, the GAN can be used to generate (426)

synthetic test escape data. Method 420 can be carried out, for example, by GAN 600 of FIG. 6.

Figure 5:
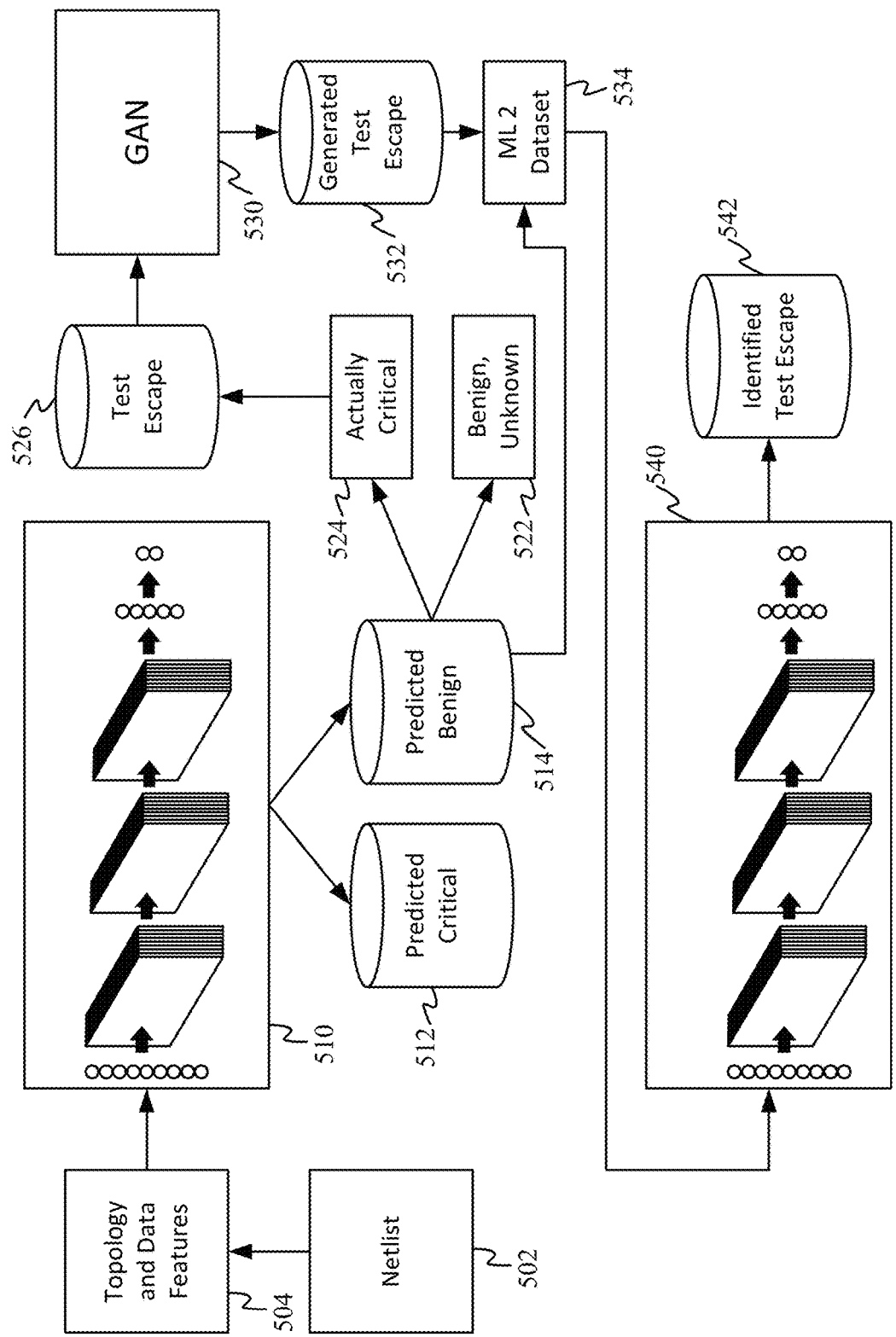
FIG. 5 an example training configuration for a system to evaluate for fault criticality.

FIG. 5 illustrates an example training configuration for a system to evaluate for fault criticality. Referring to FIG. 5, a training process, which may be carried out by training module 240 described with respect to FIG. 2, includes using a netlist 502 for the target hardware architecture and a feature set 504 of topology features and dataset features to train a first machine learning module 510 that outputs a dataset of predicted critical nodes 512 and a dataset of predicted benign nodes 514. The dataset of predicted benign nodes 514 can be subdivided into a dataset of actually critical nodes 524 and a dataset of benign and unknown nodes 522.

Figure 6:
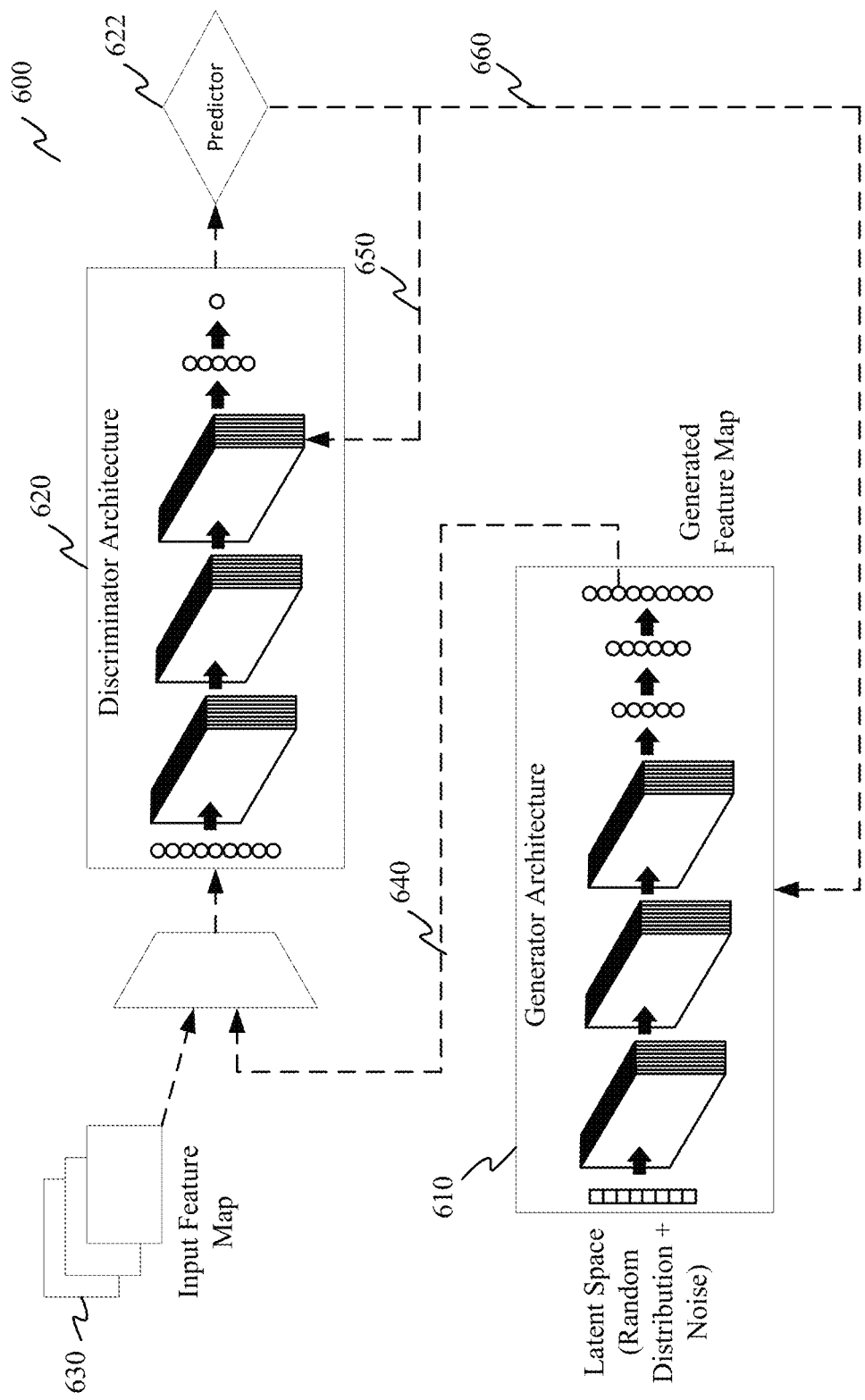
FIG. 6 illustrates a GAN machine learning architecture used to generate additional test escapes for use in training a second machine learning module of a system for evaluating fault criticality which specializes in identifying test escapes.

The actually critical nodes 524 can be provided to a test escape resource 526 used by a GAN 530, which can be implemented as described with respect to FIG. 6, to generate synthetic test escape data (e.g., stored in generated test escape resource 532). The synthetic test escape data can be added to the dataset (e.g., ML 2 dataset 534) used to train the second machine learning module 540 so that there is more data for identifying false negatives.

The second machine learning module 540 is trained to output identified test escape data 542 using dataset of predicted benign nodes 514 and, when generated, the synthetic test escape data.

FIG. 6 illustrates a GAN machine learning architecture used to generate additional test escapes for use in training a second machine learning module of a system for evaluating fault criticality which specializes in identifying test escapes. The GAN 600 can a generator neural network ("generator") 610 and a discriminator neural network ("discriminator") 620. The generator 610 takes input and generates new data instances and the discriminator 620 evaluates the new data instances for authenticity (e.g., identifying fake data from real data). Through backpropagation, the discriminator's classification can provide a signal that the generator 610 uses to update its weights. In other words, a GAN estimates generative distribution via the discriminator 620 (also referred to as an adversarial supervisor). Specifically, the generator 610 attempts to imitate the data from target distribution to make the 'fake' data indistinguishable to the discriminator 620.

The discriminator 620 is trained using real data 630 as positive examples and synthetic data 640 as negative examples. The synthetic data 640 used for the training is generated by the generator 610 while maintaining constant weights. During training, the discriminator 620 classifies the data (both the real data 630 and the synthetic data 640) and uses backpropagation of only the discriminator loss 650 to update its model (e.g., the weights for the discriminator network). The discriminator loss 650 penalizes the discriminator for misclassifying the data.

The generator 610 is trained using feedback from the discriminator 620. An initial input (usually a form of noise such as random distribution and noise), is first used to create synthetic data (based on some initial weights at the generator neural network) and this synthetic data is sent to the discriminator 620 to classify. The discriminator 620 produces a generator loss 660 (which was ignored during the discriminator training) that is backpropagated through the discriminator 620 and generator 610 to obtain gradients. The gradients are then used to adjust the weights for the generator neural network 610.

In operation, the input feature map 630 can be a set of real data that is input to the discriminator 620 to compare to generated data 640 from the generator 630. For example, the input feature map can be a subset of the dataset of predicted benign nodes that are known to be actually critical.

The discriminator architecture 620 can compare the input feature map and the generator architecture generated data from the generator architecture 630. In a specific implementation, the GAN discriminator architecture can include three {3×3×8} 3-dimensional convolution neural networks followed by a {10×1} fully connected layer; and a predictor 622 which can provide a confidence/probability value; and the GAN generator architecture can include a {1×100} latent space, three {3×3×8} 3-dimensional convolution neural networks followed by a {140×170} fully connected layer. The latent space can be used to determine random space or noise to be used as starting points for the synthetic test escapes that are refined by the three 3-dimensional convolution neural networks.

The generator architecture 630 can generate synthetic data, for example synthetic test escape nodes; and the discriminator architecture can assign a probability value of the node being benign or critical.

Figure 7:
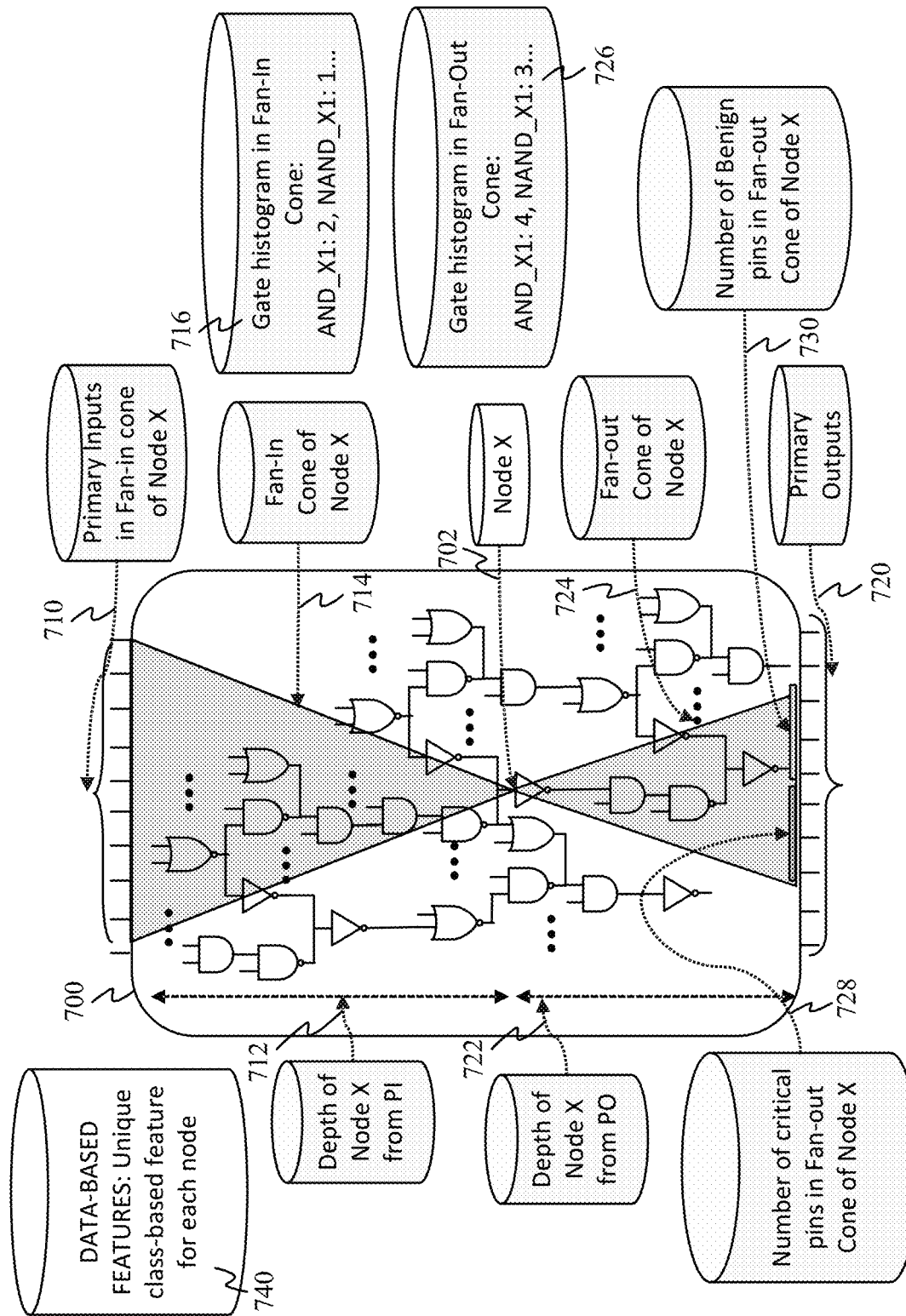
FIG. 7 illustrates various features used in evaluating fault criticality.

FIG. 7 illustrates various features used in evaluating fault criticality. The topology features are derived from analysis of features of a subset 700 of the entire netlist. It can be desirable to obtain a subset that could be considered self-contained, for example a single processing element of a systolic array. Topology features for a particular node 702 of the subset 700 can include terminal features, connectivity features, and physical features. All topology features are determined for the particular node 702.

Terminal features can include a set of primary inputs 710 of fan-in cone for the particular node 702, a set of primary outputs 720 of fan-out cone or the particular node 702, a number of critical pins in fan-out cone 728, and a number of benign pins in fan-out cone 730. The set of primary inputs 710 can be a list of all inputs that are coupled to the inputs of the particular node 702. The set of primary outputs 720 can be a list of all outputs that are coupled to the outputs of the particular node 702. The number of critical pins in fan-out cone 728 can be a subset of the primary outputs 720 of fan-out cone that were experimentally determined to be critical in circuit functionality. The number of benign pins in fan-out cone 730 can be a subset of the primary outputs 720 of fan-out cone that were experimentally determined to not be critical in circuit functionality.

Connectivity features can include a fan-in cone 714, a fan-out cone 724, gate histogram of fan-in cone 716, and gate histogram of fan-out cone 726. The fan-in cone 714 can be a description of the path between one or more primary inputs of the set of primary inputs 710 of the target hardware architecture and the particular node 702. The fan-out cone 724 can be a description of the path between the particular node 702 and one or more primary outputs of the set of primary outputs 720 of the target hardware architecture. The gate histogram of fan-in cone 716 can be a description of the circuit elements in one or more paths between one or more of the primary inputs of the set of primary inputs 710 of the target hardware architecture and the particular node 702. The gate histogram of fan-out cone 726 can be a description of the circuit elements in one or more paths between the particular node 702 and one or more of the primary outputs of the set of primary outputs 720 of the target hardware architecture.

Physical features can include depth of node from primary inputs 712 and depth of node from primary outputs 722. Depth of node 712 from primary inputs can be a physical distance of the particular node 702 from an edge including one or more primary inputs of the set of primary inputs 710, a number of circuit elements between the particular node 702 and one or more of the primary inputs of the set of primary inputs 710, or a distance through which a signal must travel between one or more of the primary inputs of the set of primary inputs 710 and the particular node 702. Depth of node 722 from one or more of the primary outputs of the set of primary outputs 720 can be a physical distance of the particular node 702 from an edge including one or more of the primary outputs of the set of primary outputs 720, a number of circuit elements between the particular node 702 and one or more of the primary outputs of the set of primary outputs 720, or a distance through which a signal must travel between the particular node 702 and one or more of the primary outputs of the set of primary outputs 720.

Data-based features 740 can be a representation of fault-free behavior. Data-streams can be applied to each node and a weighted compression across all simulation cycles can be found to determine ideal behavior at the particular node 702. For example, the data-based features 740 are extracted through weighted compression of the bit-stream flowing through a particular node across all simulation cycles. The first bit-stream can be averaged across the test set and then the average bit-stream is compressed in a weighted fashion across all cycles of simulation. An example is illustrated with respect to FIG. 10.

ILLUSTRATIVE EXAMPLE

A system for evaluating fault criticality using machine learning was implemented using LeNet-5M architecture. LeNet-5M is a deep convolutional neural network (CNN) architecture having three convolution layers, two fully connected layers, and two subsampling layers, where each convolution and fully connected layer is followed by rectified-linear units (ReLU). The subsampling layers in LeNet-5M perform average pooling. Average pooling facilitates hardware reuse because the average pooling operation can be formulated as a special case of 3D-convolution, thereby obviating the need for specialized logic to perform max-pooling operation.

Figure 8A:
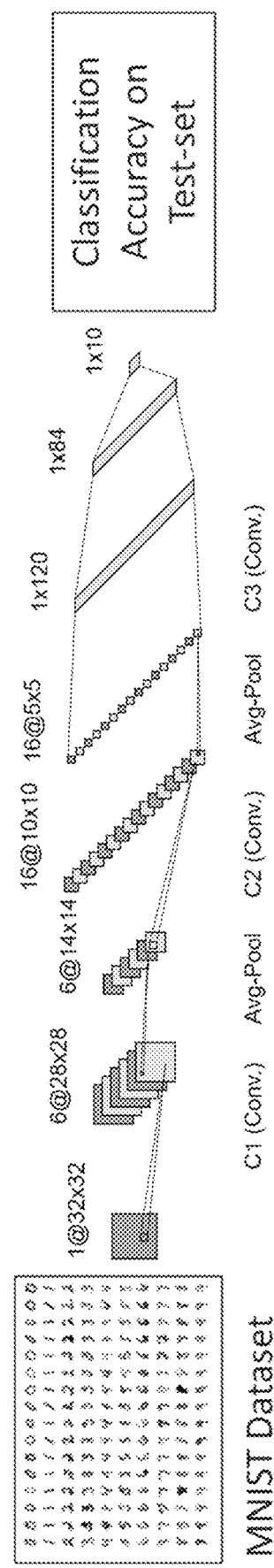
FIG. 8A shows a LeNet-5M architecture.

FIG. 8A shows a LeNet-5M architecture. Referring to FIG. 8A, for the illustrative example, the input to the network was a 28×28 grayscale image with zero padding, creating a 322 receptive field. The first convolutional layer (C1) contains six filters (kernels) of size 5×5. The second convolutional layer (C2) contains 16 filters of size 5×5. Each convolutional layer is followed by a bias addition and ReLU activation unit followed by an average-pooling layer. The last two fully connected layers down-sample the output feature maps and contain 120 (FC1) and 84 (FC2) neurons, respectively, before being fully connected to the output layer, which contains 10 neurons. Each output neuron represents the confidence value for the 10 individual classes in the dataset.

The network was designed and trained in MATLAB on a dataset of 7,500 images from the MNIST benchmark described in "Gradient-based learning applied to document recognition," by Y. LeCun et al. (Proc. IEEE, vol. 86, no. 11, pp. 2278-2324, 2998) with an equal number of images in all 10 categories (digits "0" to "9"). The input data includes 100 images with 10 images from each class. This data is used to evaluate and characterize the impact of different structural faults in the hardware with respect to the baseline model performance.

A 128×128 systolic array for an AI accelerator was designed and implemented with both the 32-bit and 16-bit IEEE FP data formats. Design configurations were simulated at the processing element level using Python followed by RTL design and logic synthesis using Verilog HDL.

Figure 8B:
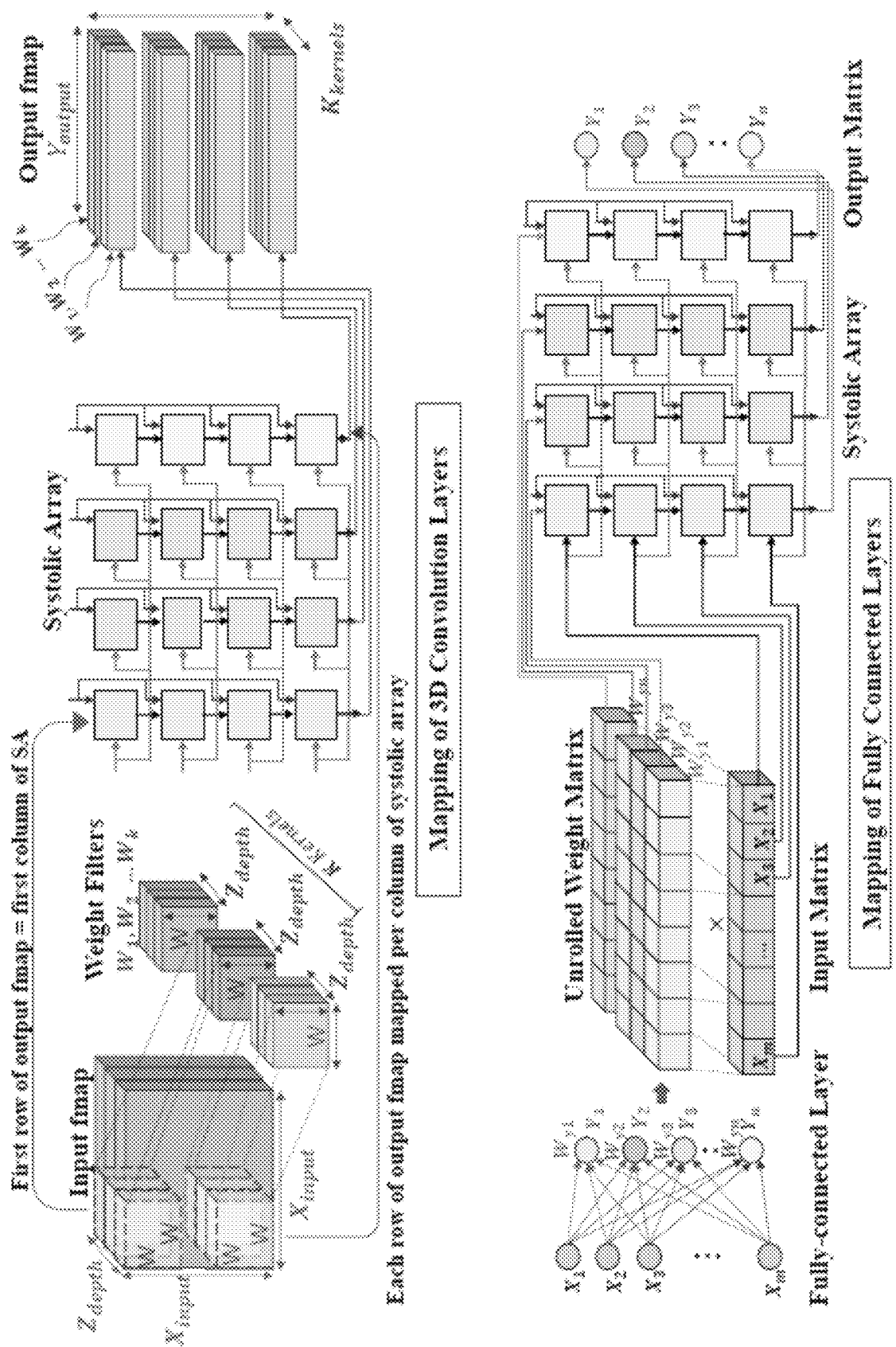
FIG. 8B illustrates a mapping strategy of an AI accelerator hardware architecture with an applied use-case of image recognition.

FIG. 8B illustrates a mapping strategy of an AI accelerator hardware architecture with an applied use-case of image recognition. Referring to FIG. 8B, a layer-specific optimal mapping strategy was adopted for each layer type. For convolutional layers, the 3D input feature maps and weights were mapped in such a way that the weights were fixed at the rows of the systolic array while the inputs were rolled in through each column. Both weights and inputs were unrolled in column-major format, allowing twice the throughout compared to unrolling in the row-major format. Convolution was performed one output feature slice at a time. Each column produces one row of the output feature map.

Mapping for average pooling layers was performed as a special case of 3D convolution, where convolution was mimicked with weight kernels of size 2×2×Z×K with each cell having a value of 0.25, Z being the number of input channels, and K being the number of weight kernels. Mapping for fully connected layers was also performed in a fashion similar to 3D convolution layers, but the weights and inputs were reversed with each other. Bias addition was performed using a separate set of adders outside the systolic array. Of course, different mapping strategies lead to error propagation through the network in different ways, leading to potentially different functional impacts for the same structural fault.

Structural faults were injected into the AI accelerator mapped to LeNet-5M within behavioral and structural models, in Python and Verilog HDL, respectively to study the impact of injected faults on classification performance. The fault-injection framework supports stuck-at-faults (s-a-0, s-a-1), bridging faults to model shorts through wired-AND wired-OR approaches, and delay faults to model opens. Described herein is an analysis and results of single-stuck-at faults. Fault injection is done inside a processing element (PE) of the systolic array (i.e., the adder and multiplier macros as well as its periphery at the pin-level). The impact of the injected fault on the inferencing accuracy is assessed using an input dataset. Fault injection is carried out in two phases. In the first phase the criticality of pin-level faults is evaluated by injecting faults only at the periphery of a PE along with interface buses for the adder and multiplier macros within the PE. The second phase consists of injecting internal structural faults in the gate-level netlist; these faults may be selected on the basis of the criticality of pin-level faults derived in the first phase.

Figure 9A:
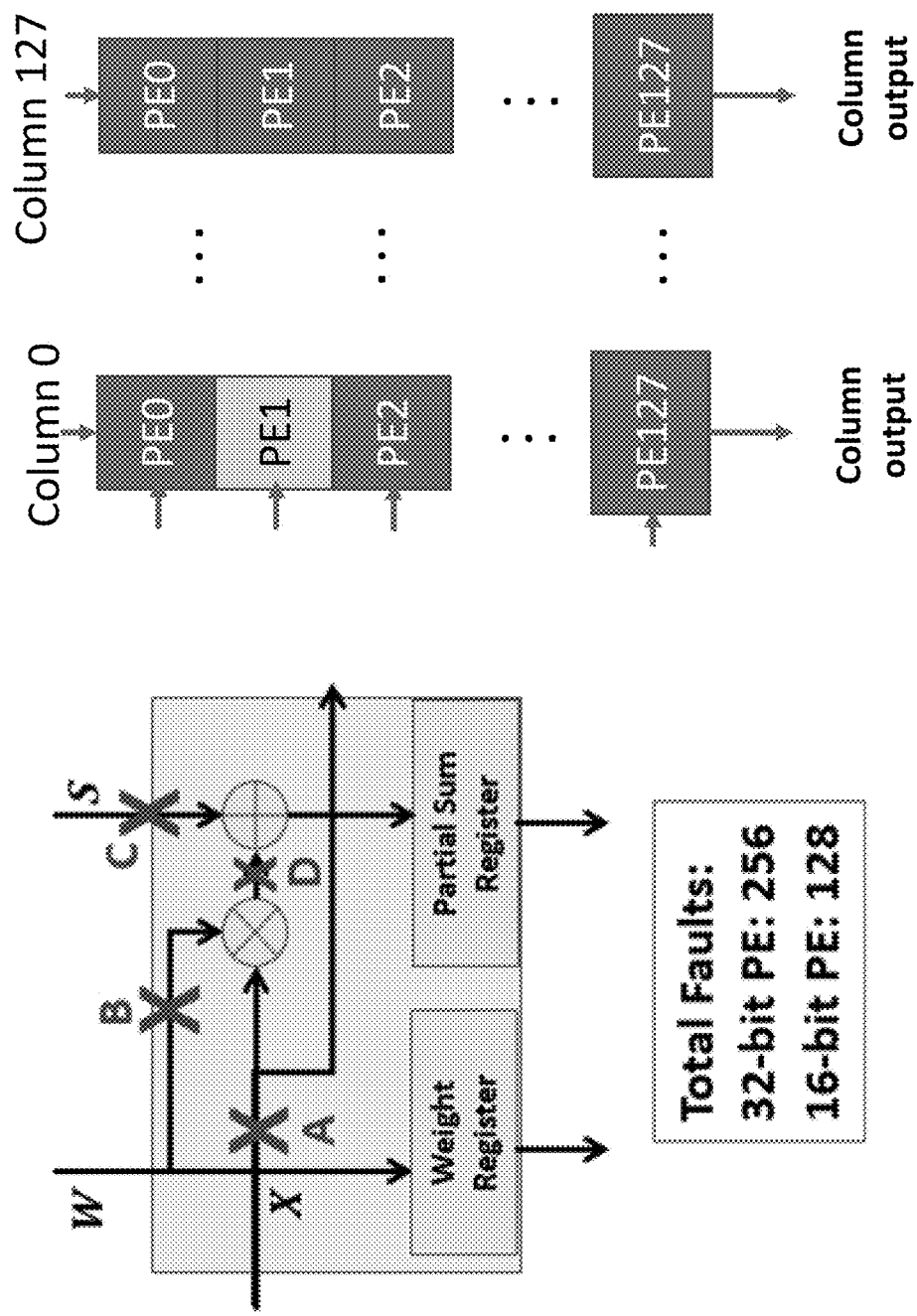
FIGS. 9A-9F show details and results for the example implementation of evaluating an AI accelerator.

FIGS. 9A-9F show details and results for the example implementation of evaluating an AI accelerator. Referring to FIG. 9A, a PE in the systolic array consists of three input buses, namely A, B, and C, where A and B are inputs to the multiplier while C is the accumulation input bus to the adder within the PE. The multiplier output-bus internal to the PE is denoted as bus D. As each bus is 32 bits wide, a total of 256 faults are injected and simulated for functional impact in case of a 32-bit PE. Similarly, 128 faults are injected for a 16-bit PE. Each pin of the bus is functionally simulated for both s-a-1 and s-a-0 faults. The pin-level fault-injection experiments were performed for 16-bit and 32-bit PE architectures.

Figure 9B:
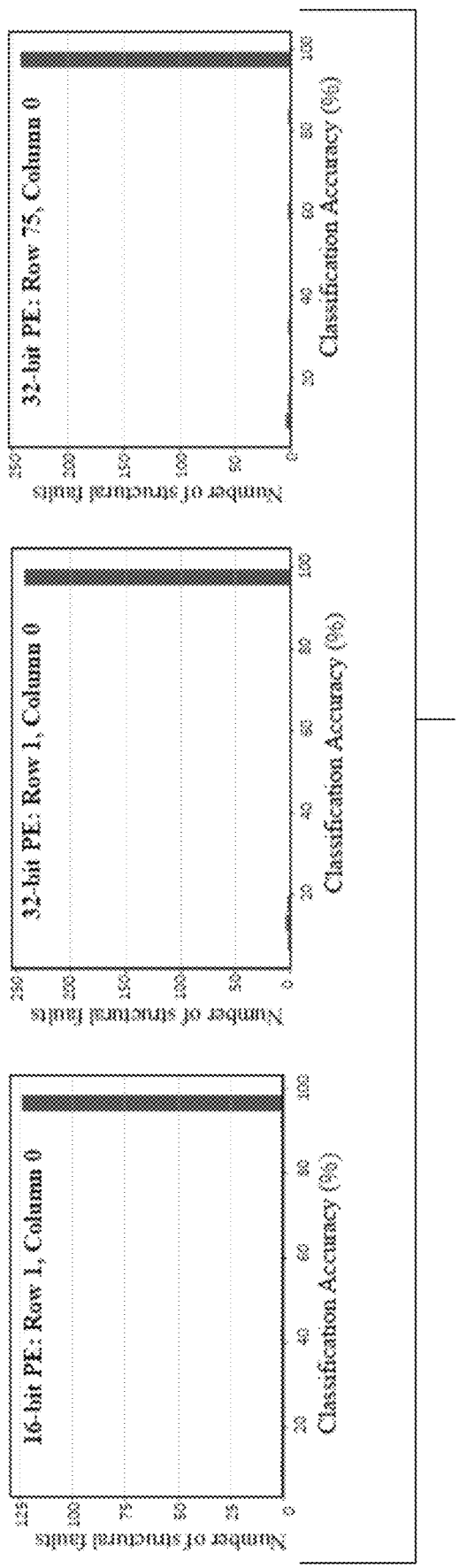

Results on pin-level structural fault criticality are shown in FIG. 9B, which shows results for a 16-bit PE in row 1 column 0, and 32-bit PEs in rows 1 and 75 of column 0, respectively. In the analysis, the accuracy threshold was set at 95% so that a fault was considered functionally critical if the classification accuracy was less than 95%.

Figure 9C:
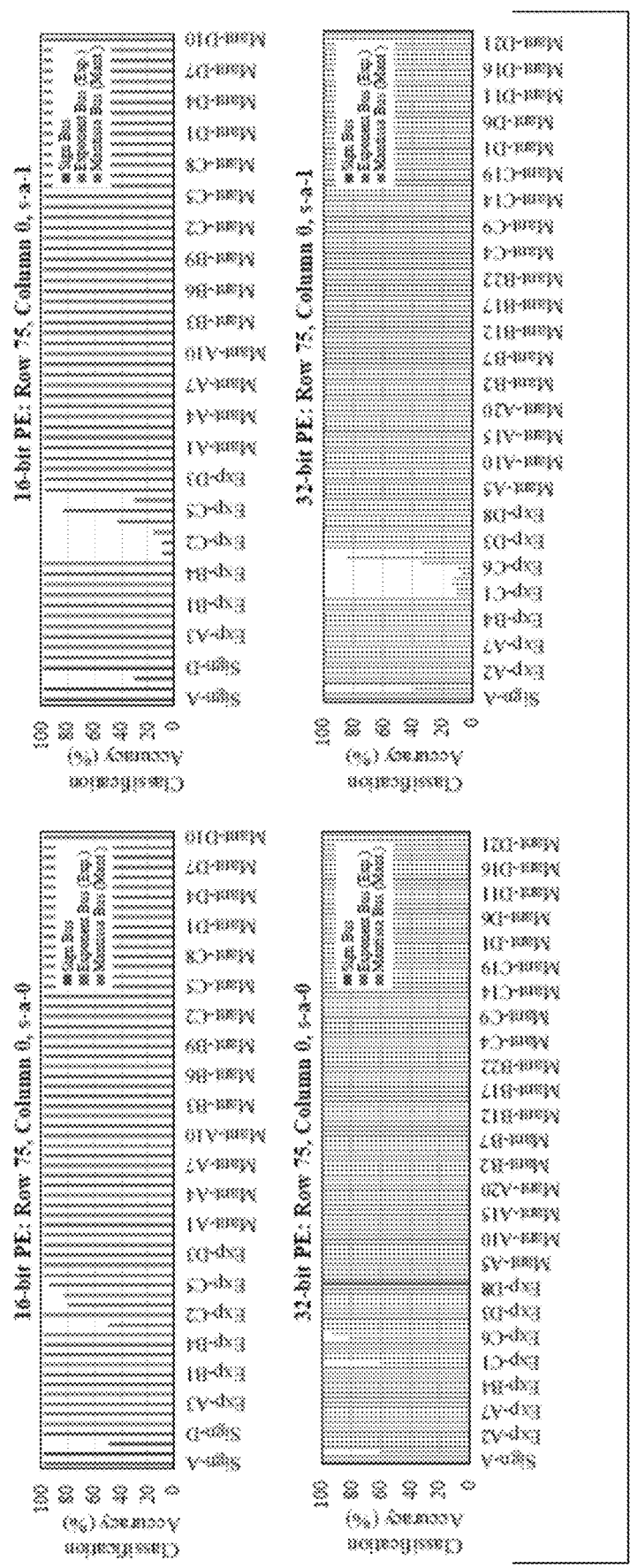

FIG. 9C illustrates the classification accuracy for all the injected faults (s-a-0, s-a-1) and for all the PE buses (A, B, C, and D) of a PE in row 75, column 0 for both 16-bit and 32-bit architectures. Each bus includes bits for sign, exponent, and mantissa according to the IEEE Std. 754. From the results, it can be seen that most of the faults in the mantissa bits for all four buses are benign and have no impact on classification accuracy, the faults in the sign bits for buses A, B, and D are benign and have no impact on the classification accuracy, the faults in the exponent bits for buses A and B are also benign and have no impact on classification accuracy, a majority of single-pin faults in buses A and B are benign, and faults in the exponent bits in buses C and D as well as in the sign bits in bus C are critical.

Figure 9D:
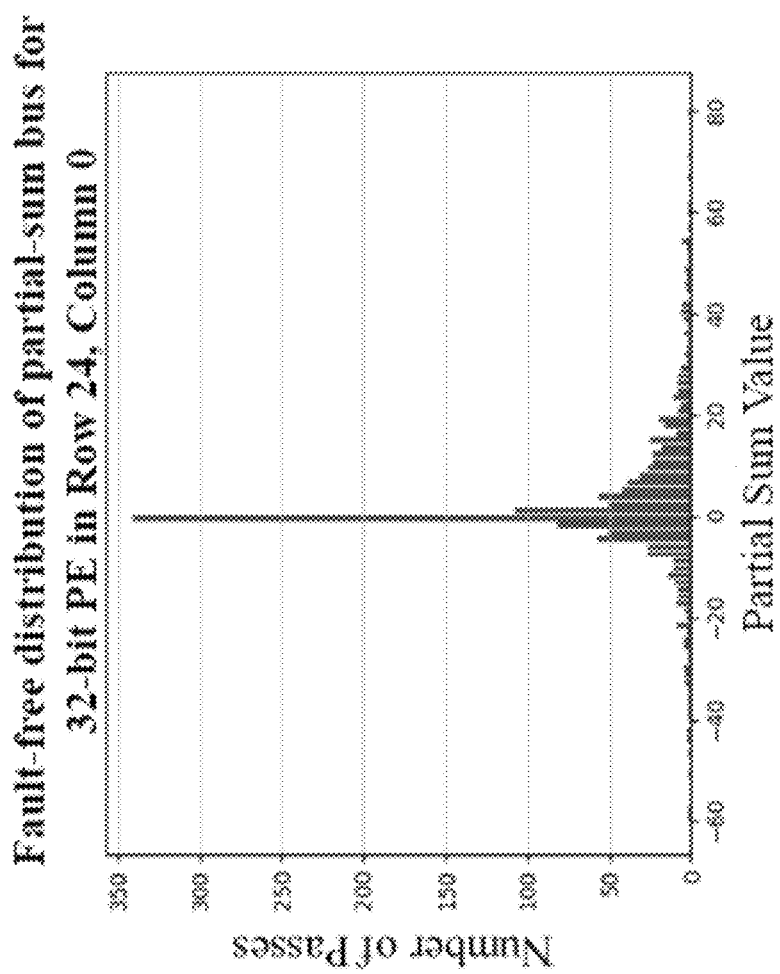

Referring to FIG. 9D, the functional criticality of faults in specific pins of the PE were evaluated based on the fault-free range of data values passing through the pins across all iterations of the CNN. For example, for the partial-sum bus of a 32-bit PE (row 24, column 0), the maximum magnitude of the partial-sum value is less than 80 for the inferencing dataset under consideration-100 MNIST images. Since a maximum value of the 8-bit exponent is $127 + \log_2 80$, the bits 2-5 of the exponent from the most-significant bit (MSB) side will always be 0 and s-a-0 faults for these bits of the bus are always benign.

Figure 9E:
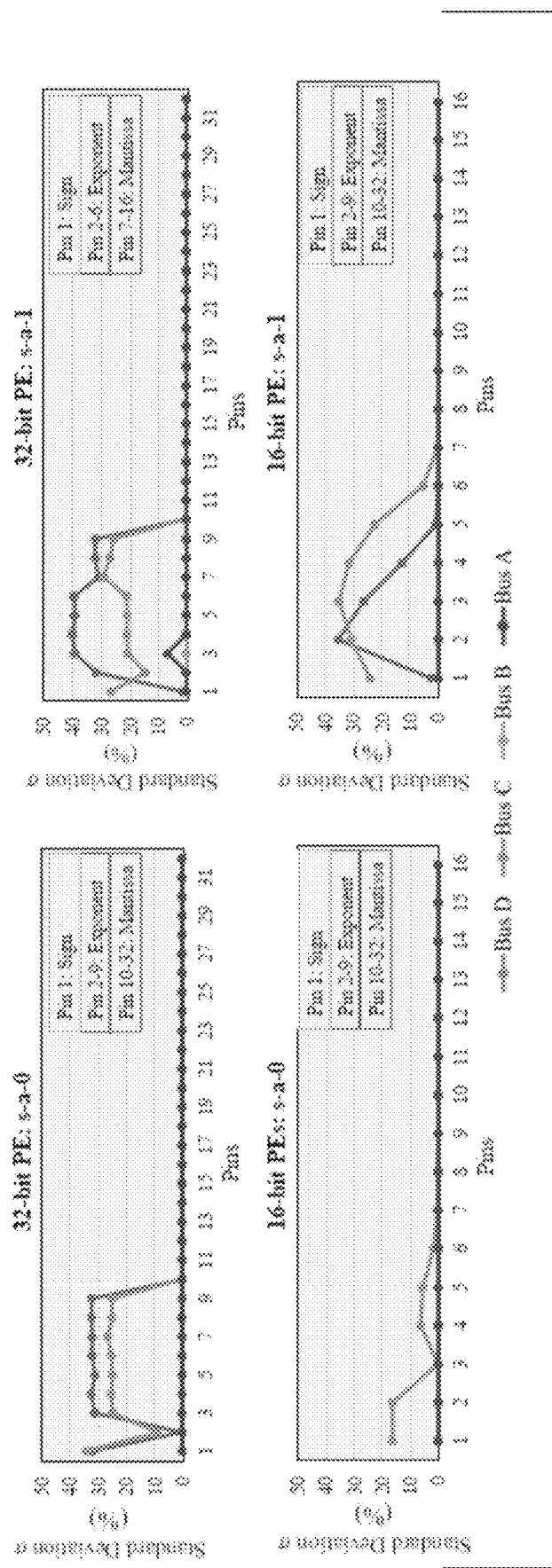

FIG. 9E shows that the standard deviation in classification accuracy for faults in the mantissa pins is negligible for all four buses. Moreover, the σ in classification accuracy for faults on buses A and B is also very low. This indicates that faults in these pins are highly correlated across PEs in the array. However, the σ for faults in the exponent and sign bits of buses C and D is significantly high, and since these faults are functionally critical, these faults shouldbe considered for structural testing.

Figure 9F:
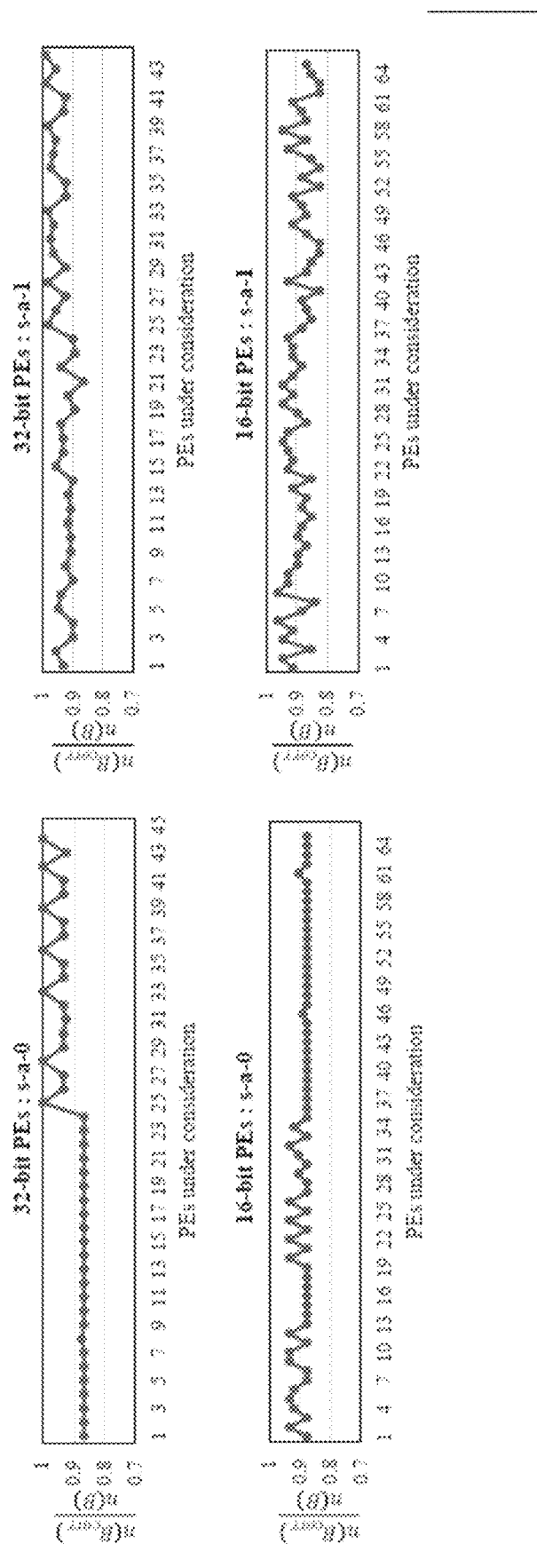

FIG. 9F shows statistical correlation in benign behavior of pin-level faults. Referring to FIG. 9F, the probability of benign pin-level faults (s-a-1, s-a-0) remaining benign in other PEs is shown for 16- and 32-bit architectures. As shown in the plots, the ratio of $n(B_{corr})/n(B)$ exceeds 0.9 in most cases, where $B_{corr}$ denotes the set of all faults in a set B of all benign pin-level faults for a given PE with low σ (σ<0.7%) in classification accuracy across other PEs and n(X) is the cardinality of set X. When the ratio is very high (e.g., exceeds 0.9), there is a high likelihood of a benign pin-level fault in a PE also remaining benign in other PEs. This demonstrates that criticality identification of a benign fault is highly likely to be transferred to other PEs in the array.

Table 1 shows average percentage distribution of pin-level critical faults for all four buses across the 16-bit and 32-bit PEs.

TABLE 1

| | 32-bit PE % at critical faults | | 16-bit PE % of critical faults | |
| --- | --- | --- | --- | --- |
| PE Bus | s-a-0 | s-a-1 | s-a-0 | s-a-1 |
| A | 0 | 1.42 | 0 | 0 |
| B | 0 | 0 | 0 | 0 |
| C | 12.78 | 22.88 | 5.28 | 20.67 |
| D | 4.11 | 12 | 0 | 7.01 |

It can be seen that bus C (the accumulation input bus) has the largest percentage of critical faults across all PEs under consideration, followed by bus D (the multiplier output bus). In addition, it can be seen that the distribution of critical faults in these buses is localized among the sign and exponent bits.

Table 2 shows the percentage of internal fault sites within the 16-bit and 32-bit PEs, classified as provably benign.

TABLE 2

| | 32-bit PE | | 16-bit PE | |
| --- | --- | --- | --- | --- |
| | Adder | Multiplier | Adder | Multiplier |
| Provably benign internal fault sites (%) | 4.3 | 7.6 | 5.2 | 12.6 |

Figure 10:
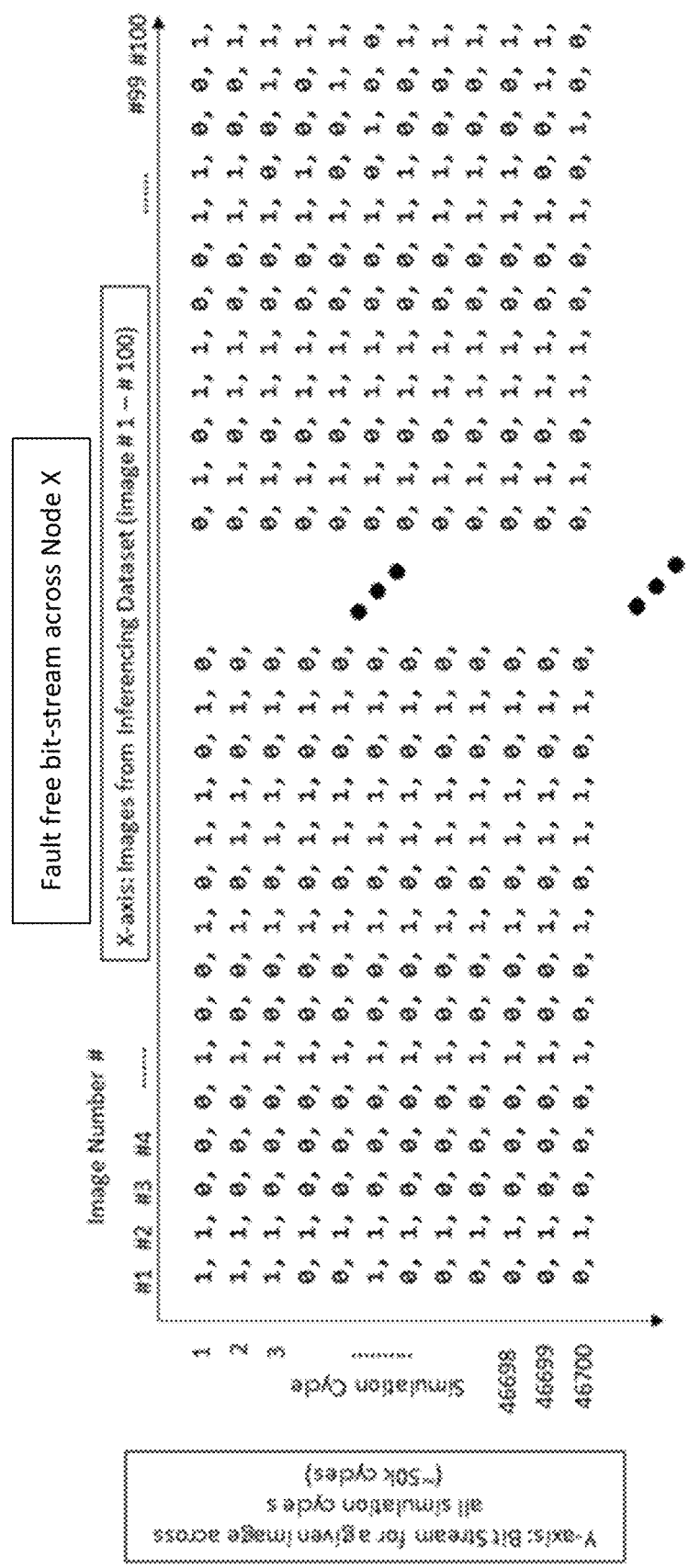
FIG. 10 illustrates a data compression method to achieve fault-free data compression for use in a system to evaluate fault criticality.

FIG. 10 illustrates a data compression method to achieve fault-free data compression for use in a system to evaluate fault criticality. This can be used, for example, in determining data features for a target hardware architecture, such as described with respect to FIG. 7. In the example shown in the FIG. 10, a dataset comprising data features includes 10 classes each with 10 test images, for a total of 100 test images ($T_{im}$) each with corresponding bitstreams, wherein each bitstream includes a certain number of bits corresponding to a total simulation cycle count for inferencing ($N_{cyc}$).

A dataset comprising 100 bitstreams can be compressed using a first method of compression along all images (i.e., along $T_{im}$) and a second method of compression along all simulation cycles (i.e., along $N_{cyc}$). The first method and second method can both be used to further compress the dataset.

The first method can compress all bitstreams relating to one class into a single representative bit stream. For each simulation cycle, a bit value can be found by choosing a bit value that occurs most frequently across all images belonging to the one class. The second method can compress a bitstream to a single score. If $b_{ij}$ is the bit-value of the $i^{th}$ cycle of the $j^{th}$ bit-stream, then the score of the particular class represented by the bit-stream can be $S_j = \Sigma_{i=1}^{N_{cycle}}(b_{ij} \times i)$. As such, bits at the end can be given increased weight when compared to bits in initial cycles. In the example, the dataset comprising of 100×46700 bits can be compressed to only ten.

Tables 3A-3C show an evaluation of a fault criticality assessment by the system to evaluate fault criticality in several processing elements (PEs), where Table 3A shows the result of five such experiments in an adder portion of a 32-bit PE, Table 3B shows the result of five such experiments in a multiplier portion of a 32-bit PE, and Table 3C shows the result of five such experiments in a multiplier portion of a 32-bit PE. As you can see, not only did the number of faults misclassified as benign once again drop substantially when a second machine learning module is used, but none of the faults misclassified as benign proved to be "catastrophic faults". As can be seen, the number of faults misclassified as benign dropped substantially when a second machine learning module is used. In each, the first column (Exp.) denotes a particular experimental trial. The second column ($N_{cr}$) denotes the number of nodes that are known to be critical. The third column ($A_{ML1}$) denotes accuracy of the first machine learning module at identifying critical nodes as a percentage. The fourth column ($F_{cr}$) denotes the number of nodes that are evaluated as critical by the system (including both nodes known as critical and nodes known as benign). The fifth column ($TE_1$) denotes nodes that are evaluated by the first machine learning module as benign that are known to be critical (i.e., "test escapes"). The sixth column ($TE_2$) denotes nodes (i.e., nodes evaluated as benign by the first machine learning module) that are evaluated by the second machine learning module as benign that are known to be critical. The seventh column ($TE_2^P$) denotes $TE_2$ as a percentage. The eighth column ($TE_{cat}$) denotes the number of faults misclassified as benign by ML2 (and thus also by ML1) that cause more than a 20% drop in viability (i.e., "catastrophic faults").

TABLE 3A

Adder in 32-bit PE

| Exp. | $N_{cr}$ | $A_{ML1}$ (%) | $F_{cr}$ | $TE_1$ | $TE_2$ | $TE_2^P$ (%) | $TE_{cat}$ (%) |
|---|---|---|---|---|---|---|---|
| I | 109 | 89.4 | 139 | 7 | 7 | 5.0 | 2.8 |
| II | 114 | 89.2 | 142 | 8 | 8 | 5.6 | 2.1 |
| III | 114 | 88.9 | 143 | 7 | 7 | 4.8 | 2.0 |
| IV | 116 | 88.5 | 145 | 9 | 9 | 6.2 | 3.4 |
| V | 117 | 89.0 | 149 | 8 | 8 | 5.3 | 2.6 |
| Avg. | 114 | 89.0 | 143.6 | 7.8 | 7.8 | 5.3 | 2.5 |

TABLE 3B

Multiplier in 32-bit PE

| $N_{cr}$ | $A_{ML1}$ (%) | $F_{cr}$ | $TE_1$ | $TE_2$ | $TE_2^P$ (%) | $TE_{cat}$ (%) |
|---|---|---|---|---|---|---|
| 52 | 90.0 | 55 | 12 | 4 | 7.2 | 3.6 |
| 48 | 90.7 | 51 | 11 | 4 | 7.8 | 3.9 |
| 45 | 90.1 | 59 | 9 | 2 | 3.3 | 4.3 |
| 43 | 91.6 | 46 | 8 | 2 | 4.3 | 2.1 |
| 50 | 90.5 | 54 | 9 | 2 | 3.7 | 1.8 |
| 47.6 | 90.5 | 53 | 9.8 | 2.8 | 5.2 | 3.1 |

TABLE 3C 16-bit PE

| $N_{cr}$ | $A_{ML1}$ (%) | $F_{cr}$ | $TE_1$ | $TE_2$ | $TE_2^P$ (%) | $TE_{cat}$ (%) |
|---|---|---|---|---|---|---|
| 111 | 60.4 | 158 | 45 | 3 | 1.8 | 0 |
| 105 | 61.4 | 149 | 49 | 3 | 2.0 | 0 |
| 110 | 61.4 | 153 | 51 | 3 | 1.9 | 0 |
| 105 | 59.6 | 153 | 54 | 2 | 1.3 | 0 |
| 108 | 58.5 | 151 | 56 | 3 | 1.9 | 0 |
| 107.8 | 60.2 | 152.8 | 51 | 2.8 | 1.7 | 0 |

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for evaluating fault criticality using machine learning, the system comprising:
   a storage device;
   a first machine learning module for evaluating fault criticality of a node, wherein the first machine learning module is configured to:
   receive a feature set of topology features and data features for a plurality of nodes of a target hardware architecture having an applied domain-specific use-case;
   receive an entire netlist for the target hardware architecture having the applied domain-specific use-case; and
   output a dataset of predicted benign nodes and a dataset of predicted critical nodes for the entire netlist, the dataset of predicted critical nodes being output to the storage device and stored at the storage device; and
   a second machine learning module specialized to minimize test escapes from the first machine learning module, wherein the second machine learning module is configured to:
   receive the dataset of predicted benign nodes generated by the first machine learning module; and
   output a dataset of final predicted benign nodes and a dataset of predicted test escape nodes, the dataset of predicted test escape nodes being output to the storage device and stored at the storage device as part of the dataset of predicted critical nodes at the storage device.

2. The system of claim 1, further comprising:
   a test method module for determining a targeted testing methodology based on a domain-specific fault criticality for the domain-specific use-case applied on the target hardware architecture, the domain-specific fault criticality being indicated by the dataset of predicted critical nodes, wherein the test method module is configured to:
   receive the dataset of predicted critical nodes after being updated by the second machine learning module;
   receive a customer application target; and
   determine a targeted testing methodology for the domain-specific use-case applied on the target hardware architecture, wherein the predicted critical nodes are used to determine which nodes are to be tested and the customer application target is used to determine how nodes to be tested are tested.

3. The system of claim 2, wherein the customer application target comprises automatic test pattern generation (ATPG), built-in self-test (BIST), or test point insertion.

4. The system of claim 1, further comprising:
   a training module comprising a generative adversarial network configured to generate synthetic test escape data for training the second machine learning module.

5. The system of claim 1, further comprising a training module configured to:
   receive fault simulation data for the target hardware architecture having the applied domain-specific use-case, wherein the fault simulation data corresponds to a subset of an entire circuit to be tested, the fault simulation data comprising known critical nodes and known benign nodes;
   receive an initial set of features including topology features and data features for a plurality of nodes of a target hardware architecture having an applied domain-specific use-case;
   train the first machine learning module using the fault simulation data to predict fault criticality of a particular node of the subset of the entire circuit based on associated topology and data features for the particular node with respect to the feature set including the topology features and the data features; and
   train a second machine learning module using the fault simulation data and nodes predicted as benign by the first machine learning module during training.

6. The system of claim 1, further comprising a feature set module configured to:

generate the topology features by:
    extracting topology information for each node of the entire netlist through that node's fan-in cone analysis; and
generate the data features by:
    obtaining a test set of data, each data in the test set comprising a bitstream, wherein each bitstream includes a certain number of bits corresponding to a total simulation cycle count for inferencing; and
    compressing the test set of data using a first method and a second method, wherein the first method compresses bitstreams relating to a same class together and the second method compresses the compressed bitstreams across simulation cycles by, for each simulation cycle, selecting a bit value that occurs most frequently across all data belonging to a particular class.

7. The system of claim 1, wherein the target hardware architecture includes structural faults due to aging.

8. The system of claim 1, wherein the target hardware architecture comprises a systolic array.

9. The system of claim 1, wherein the domain-specific use case applied on the target hardware architecture is a neural network for performing inferencing.

10. A method for training a system to evaluate for fault criticality, the method comprising:
    receiving fault simulation data for a target hardware architecture having an applied domain-specific use-case, wherein the fault simulation data corresponds to a subset of an entire circuit to be tested, the fault simulation data comprising known critical nodes and known benign nodes;
    receiving a feature set of topology features and data features for a plurality of nodes of a target hardware architecture having an applied domain-specific use-case;
    training a first machine learning module using the fault simulation data to predict fault criticality of a particular node of the subset of the entire circuit based on associated topology and data features for the particular node with respect to the feature set of the topology features and the data features, the training producing a set of predicted benign nodes and a set of predicted critical nodes; and
    training a second machine learning module using the fault simulation data and at least the set of predicted benign nodes produced by the first machine learning module.

11. The method of claim 10, further comprising:
receiving, at a generative adversarial network (GAN), the set of predicted benign nodes, the fault simulation data, and the feature set of the topology features and the data features;
training the GAN to distinguish features indicating actual benign features and test escape features for nodes in the set of predicted benign nodes using the set of predicted benign nodes and the fault simulation data; and
producing, via the GAN, a set of synthetic test escape nodes,
wherein the second machine learning module is further trained using the set of synthetic test escape nodes.

12. The method of claim 10, further comprising:
generating the feature set of topology features and data features for the plurality of nodes of the target hardware architecture having the applied domain-specific use-case by:
    extracting topology information for each node of a netlist of the entire circuit through that node's fan-in cone analysis to generate the topology features; and
    obtaining a test set of data, each data in the test set comprising a bitstream, wherein each bitstream includes a certain number of bits corresponding to a total simulation cycle count for inferencing; and
    compressing the test set of data using a first method and a second method to generate the data features, wherein the first method compresses bitstreams relating to a same class together and the second method compresses the compressed bitstreams across simulation cycles by, for each simulation cycle, selecting a bit value that occurs most frequently across all data belonging to a particular class.

* * * * *